(12) United States Patent
Stein et al.

(10) Patent No.: US 9,208,521 B2
(45) Date of Patent: *Dec. 8, 2015

(54) COMPUTERIZED METHOD AND SYSTEM FOR DYNAMICALLY CREATING AND UPDATING A USER INTERFACE

(71) Applicant: PEERACTIVE, INC., New York, NY (US)

(72) Inventors: David Stein, St. Ives (AU); Nicholas Rosenthal, St. Ives (AU); Robert Arbittier, Sherman Oaks, CA (US); Nir Golan, New York, NY (US)

(73) Assignee: PEERACTIVE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,807

(22) Filed: Nov. 13, 2013

(65) Prior Publication Data
US 2014/0310118 A1 Oct. 16, 2014

Related U.S. Application Data

(63) Continuation of application No. 13/962,840, filed as application No. PCT/US2012/030733 on Mar. 27, 2012.

(60) Provisional application No. 61/468,938, filed on Mar. 29, 2011.

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0605* (2013.01); *G06Q 30/0206* (2013.01); *G06Q 30/06* (2013.01); *G06Q 30/0601* (2013.01); *G06Q 30/0222* (2013.01); *G06Q 30/0239* (2013.01)

(58) Field of Classification Search
CPC .............. G06Q 30/0601; G06Q 30/08; G06Q 30/0222; G06Q 30/0239
USPC .......................... 705/14.23, 14.39, 26.1, 26.3
See application file for complete search history.

(56) References Cited

U.S. PATENT DOCUMENTS 6,636,863 B1 * 10/2003 Friesen ................................. 1/1
6,651,098 B1 11/2003 Carroll et al.
(Continued)

FOREIGN PATENT DOCUMENTS

KR 10-2002-0007931 A 1/2002
KR 10-2010-0112059 10/2010
(Continued)

OTHER PUBLICATIONS

Yeung, M.K.H. et al. "On Maximizing Revenue for Client-Server Based Wireless Data Access in the Presence of Peer-to-Peer Sharing" (Abstract), 2006 IEEE 17th International Symposium on Personal , Indoor and Mobile Radio Communications, IEEE, Piscataway, NJ, 2006.*

(Continued)

*Primary Examiner* — Nicholas D Rosen
(74) *Attorney, Agent, or Firm* — James J. DeCarlo; Greeenberg Traurig, LLP

(57) ABSTRACT

The number of users viewing a given variable directly affects the rate of change and/or outcome of said variable. In the case of eCommerce, pricing of products and/or services is based upon a user accessing a website on which products and/or services are for sale. An initial price indicia associator associates initial price indicia with the products and/or services files. The initial pricing can be based upon historical indicia or the engine itself. Thereafter, a price indicia adjuster adjusts the pricing responsive to user access of the website or related website. A user interface meter shown on the website indicates to potential buyers how much interest there is in the product and/or service being sold so that peer activity is exhibited to potential buyers to encourage sales and impulsive buying behavior. Pricing is dynamic and adjusts in real-time at a rate determined by the amount of users accessing the website.

10 Claims, 15 Drawing Sheets

(56) References Cited

U.S. PATENT DOCUMENTS

| | | |
|---|---|---|
| 7,428,555 B2 | 9/2008 | Yan |
| 7,567,927 B2 * | 7/2009 | Boglaev ............... 705/35 |
| 7,657,479 B2 | 2/2010 | Henley |
| 7,891,569 B2 | 2/2011 | Gelbman |
| 7,895,116 B2 | 2/2011 | Chatter et al. |
| 7,970,661 B1 * | 6/2011 | Abraham et al. ........... 705/26.1 |
| 8,140,405 B2 * | 3/2012 | Mesaros ............... 705/26.2 |
| 8,359,230 B2 | 1/2013 | Tsiyoni |
| 2001/0037311 A1 | 11/2001 | McCoy et al. |
| 2003/0014317 A1 * | 1/2003 | Siegel et al. ................ 705/22 |
| 2003/0083981 A1 * | 5/2003 | Fisher et al. ................ 705/37 |
| 2003/0130927 A1 | 7/2003 | Kellam |
| 2004/0010592 A1 | 1/2004 | Carver et al. |
| 2005/0125364 A1 | 6/2005 | Edmondson et al. |
| 2005/0171881 A1 * | 8/2005 | Ghassemieh et al. .......... 705/35 |
| 2006/0080227 A1 * | 4/2006 | Boglaev ............... 705/37 |
| 2006/0282369 A1 * | 12/2006 | White ............... 705/37 |
| 2007/0214045 A1 * | 9/2007 | Subramanian et al. ........ 705/14 |
| 2008/0077518 A1 * | 3/2008 | Boglaev ............... 705/36 R |
| 2008/0086407 A1 | 4/2008 | Singh |
| 2008/0114682 A1 | 5/2008 | Staddon et al. |
| 2009/0307145 A1 * | 12/2009 | Mesaros ............... 705/80 |
| 2010/0017259 A1 * | 1/2010 | Luo ............... 705/10 |
| 2010/0191552 A1 | 7/2010 | Behrens et al. |
| 2010/0217680 A1 | 8/2010 | Fusz |
| 2011/0106648 A1 | 5/2011 | Kim |
| 2011/0125605 A1 * | 5/2011 | Chatter et al. ............... 705/26.3 |
| 2011/0178889 A1 * | 7/2011 | Abraham et al. ............ 705/26.1 |

FOREIGN PATENT DOCUMENTS

| | | |
|---|---|---|
| WO | WO 2009/157722 A2 | 12/2009 |
| WO | WO 2012/135212 A2 | 10/2012 |

OTHER PUBLICATIONS

Holzschlag, M.E., "USsing HTML 4, Sixth Edition," Que, a Division of Mamillan, Indianapolis, 2000, pp. 768-771.*

International Search Report and Written Opinion for PCT/US2012/030733, completed by the Korean Intellectual Property Office on Sep. 23, 2012.

* cited by examiner

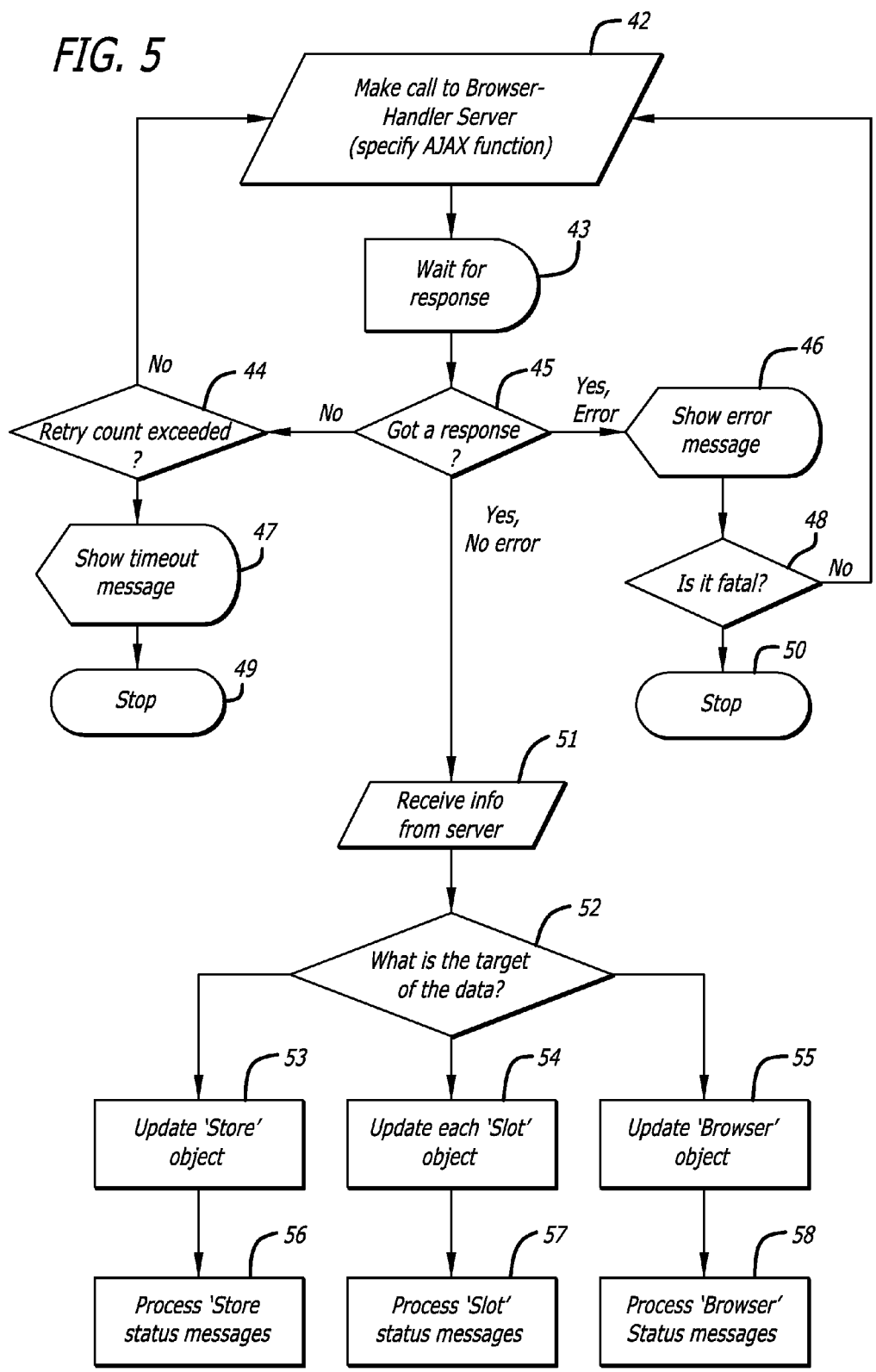

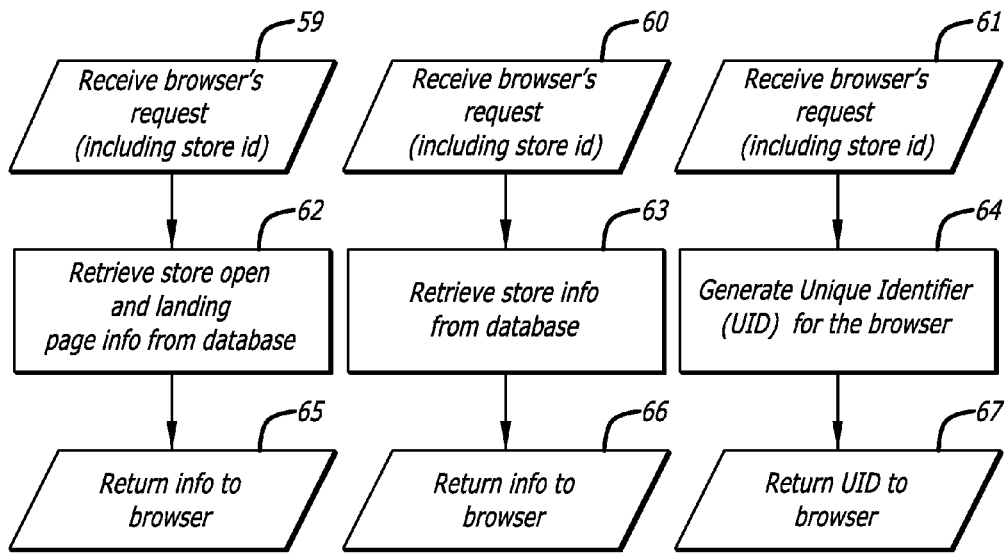
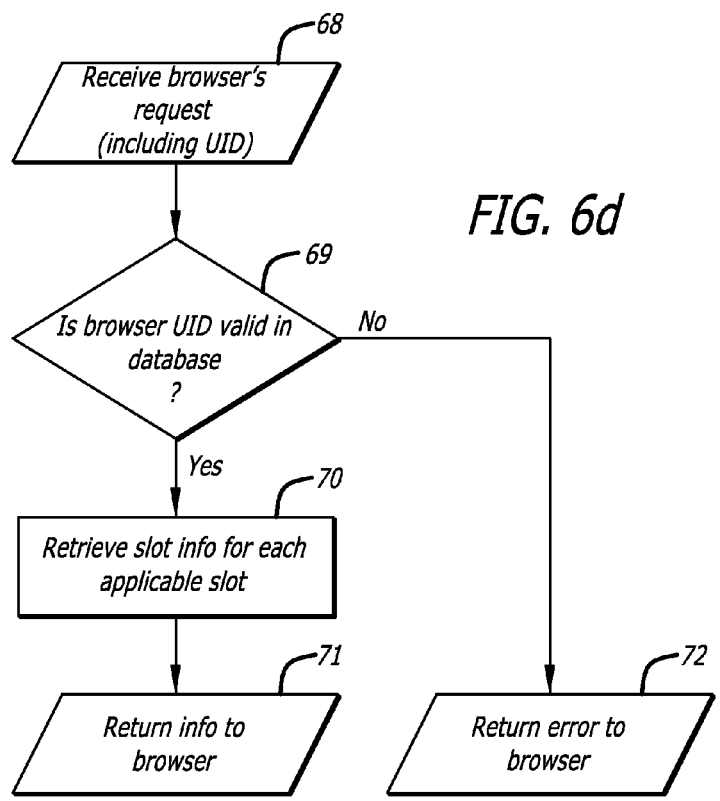

COMPUTERIZED METHOD AND SYSTEM FOR DYNAMICALLY CREATING AND UPDATING A USER INTERFACE

This application claims the benefit of and priority to U.S. Provisional Application Ser. No. 61/468,938 filed Mar. 29, 2011, and U.S. Utility application Ser. No. 13/962,840, filed Aug. 8, 2013, the contents of which are incorporated by reference herein in its entirety.

The present disclosure relates to Peeractive Technology, a method of determining a variable based on the number of users with an active interest in said variable at any moment.

More particularly, the present disclosure relates to apparatus, and an associated method, of determining Peeractive Pricing, by which the number of active users viewing specific products and/or services at any moment have a dynamic, real-time effect on the prices of said products and/or services, for instance in online shopping or auction platforms.

Furthermore, the present disclosure relates generally to a manner by which to price products and/or services that is available for delivery to consumers of the products and/or services.

More particularly, the present disclosure relates to apparatus, and an associated method, by which dynamically to price the products and/or services according to demand indicia, i.e., indications of actual demand for the products and/or services, for instance in on line shopping on an auction platform.

Further examples of the capability of the Peeractive Engine relate to advertising, value propositions, demand indicators, gaming, gambling and fundraising, and examples are provided throughout the document.

BACKGROUND

Technological advancements in digital, and other, communication technologies have permitted the development and deployment of internet based e-commerce transactions. Products and/or services can be sold by an on line auction process and communication of the transaction is by way of the internet.

With respect to products and/or services communicated by way of the Internet, a consumer of products and/or services is able to purchase individual products and/or services for delivery to a products and/or services destination, the pricing mechanisms used by which to price, and permit purchase of, the products and/or services files substantially correspond to the manners by which packaged products and/or services is normally priced and sold.

The products and/or services are priced and sold in manners that correspond substantially to the pricing and sale of products and/or services at conventional retail, and other, businesses. A price is established as the basis for establishing a price at which products and/or services is marketed and sold.

While pricing of products and/or services in this manner is based on long traditions and is widely accepted, the conventional pricing mechanisms are inexact indications of the most appropriate pricing of the products and/or services, both from the perspective of the buyer and seller.

An improved manner by which to price products and/or services by auction takes advantage of the capabilities of the internet communication systems to facilitate better optimal pricing of the products and/or services.

It is an object of this disclosure to provide for the online shopping of products and/or services using the internet based communication system which has significant improvements over prior systems. An e-commerce system of the disclosure is related to minimizing disadvantages with prior systems.

Pricing is just one context in which the disclosed system can operate, and through explaining in detail a system by which prices can efficiently be determined, additional examples of related technologies will be presented.

SUMMARY

The present disclosure provides a system, apparatus, and method, by which to price products and/or services that are available and sold by an online shop or auctioning engine in substantially real time in accordance with a more real sense of the interested number of possible purchasers of the products and/or services.

Furthermore, the present disclosure also provides alternative examples for the use of the Peeractive system, including but not limited to advertising, value propositions, demand indicators, gaming, gambling and fundraising.

A more complete appreciation of the present disclosure and the scope thereof can be obtained from the accompanying drawings that are briefly summarized below, the following detailed description of the presently-preferred embodiments of the present disclosure, and the appended claims.

DRAWINGS

The above-mentioned features and objects of the present disclosure will become more apparent with reference to the following description taken in conjunction with the accompanying drawings wherein like reference numerals denote like elements and in which:

FIG. 5 (Browser Request From Server) shows the Javascript-based procedure that the browser follows when sending information to or requesting information from the Browser-Handler Server.

FIG. 6 (Browser-Handler Server) has 7 sub-figures (6a-6g) which show the php-based procedures which run on one or more publicly-accessible web-facing server computers to service data requests from the Browsers.

Figure 7:
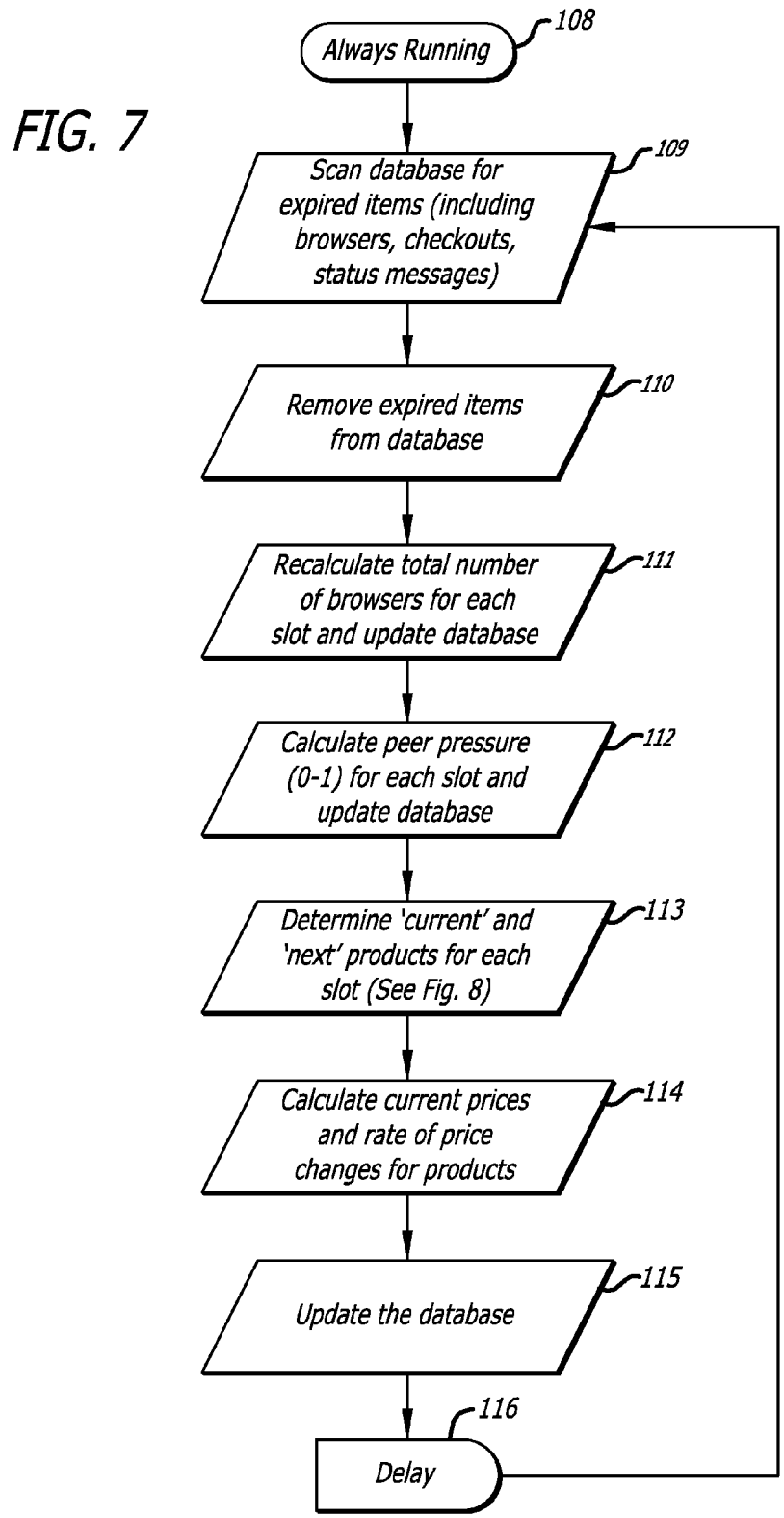

FIG. 7 (Manager Server) is a flowchart showing the operation of the php-based application which runs continuously on a single server computer and performs system-wide management functions.

Figure 8:
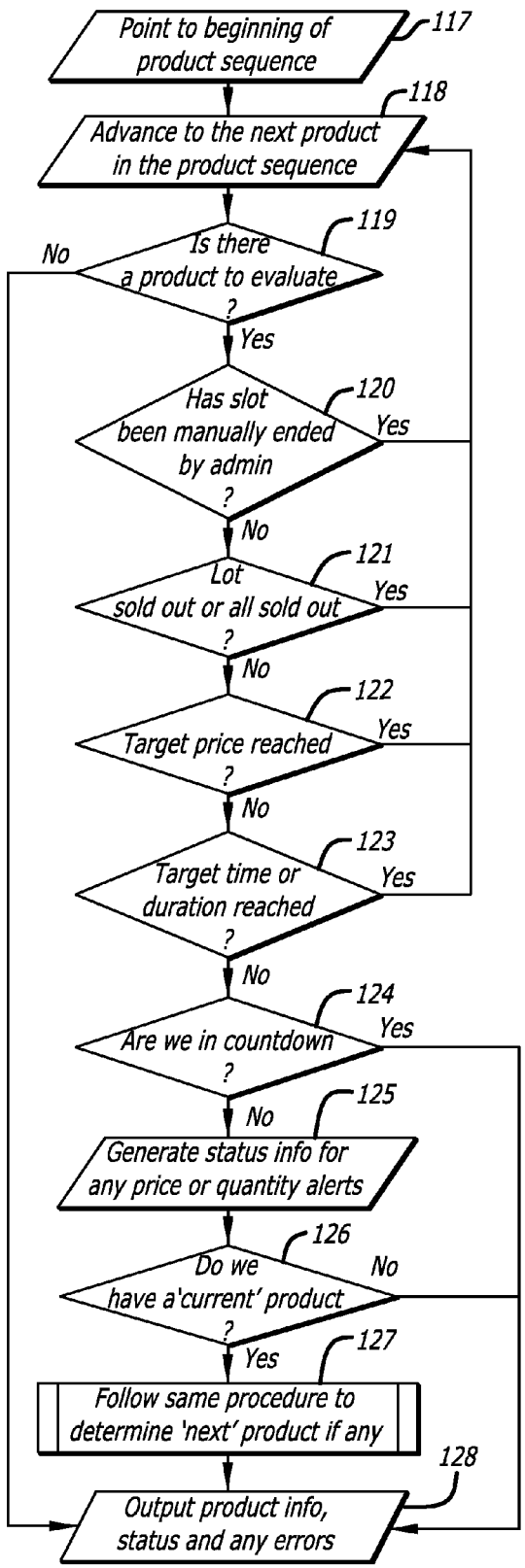

FIG. 8 (Sequence Product Selection) shows the php-based procedure followed by the Manager Server to determine the 'current' and 'next' products to be displayed in each slot.

Figure 9:
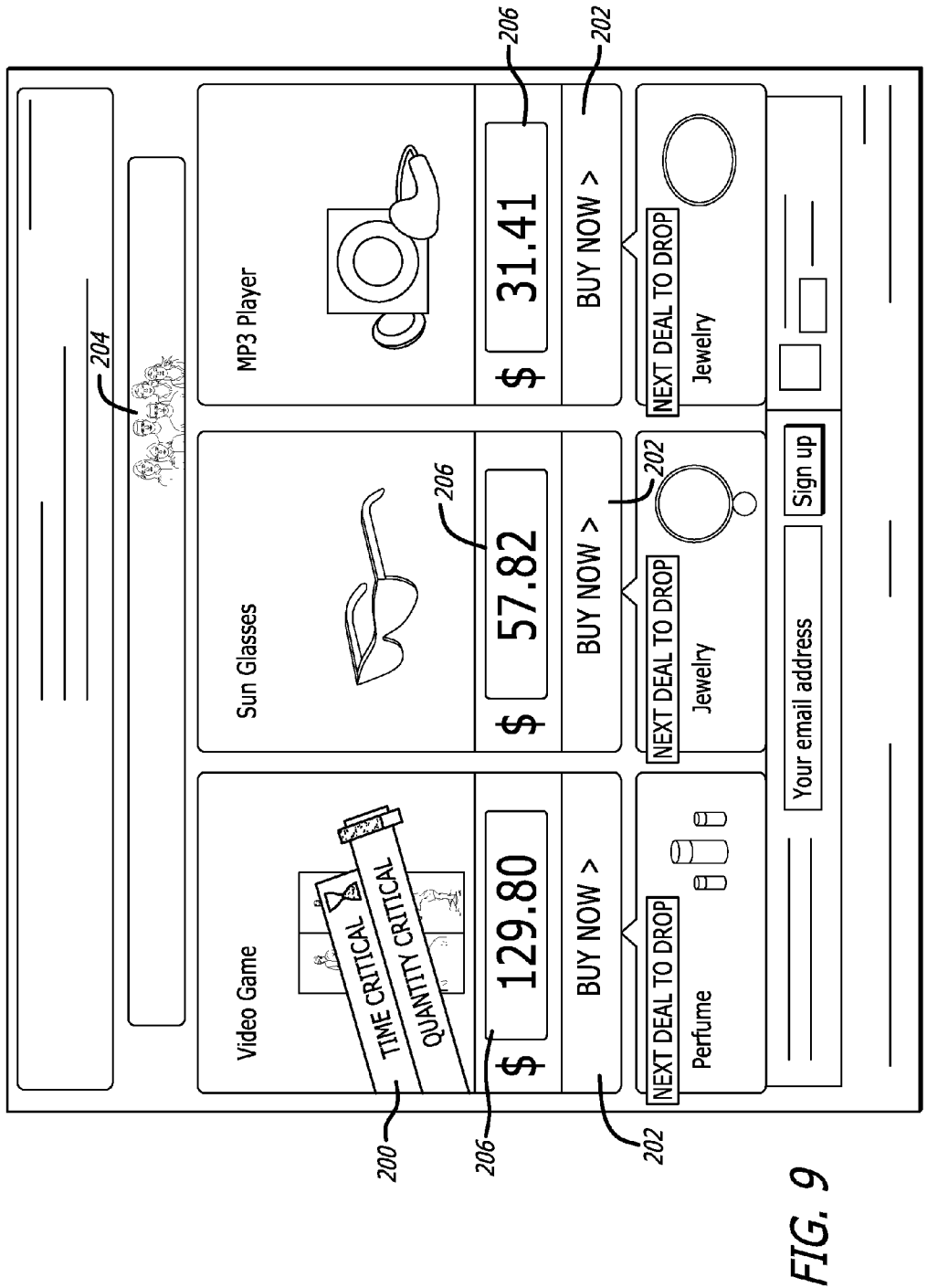

FIG. 9 is a screenshot of the Peeractive engine at work on an example retail storefront named "Drop Til You Shop."

Figure 10:
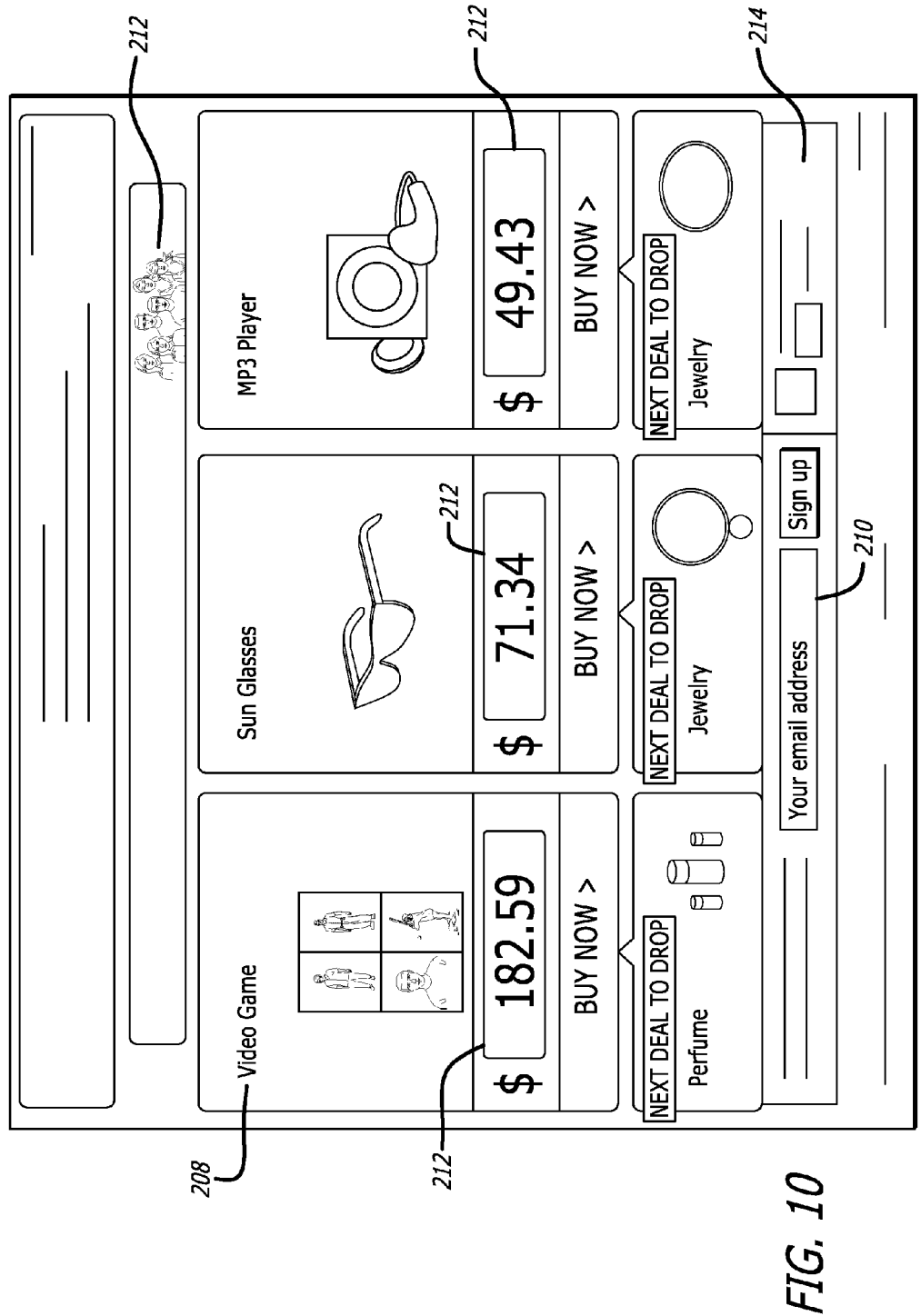

FIG. 10 is a second screenshot of the Peeractive engine at work on an example retail storefront named "Drop Til You Shop."

Figure 11:
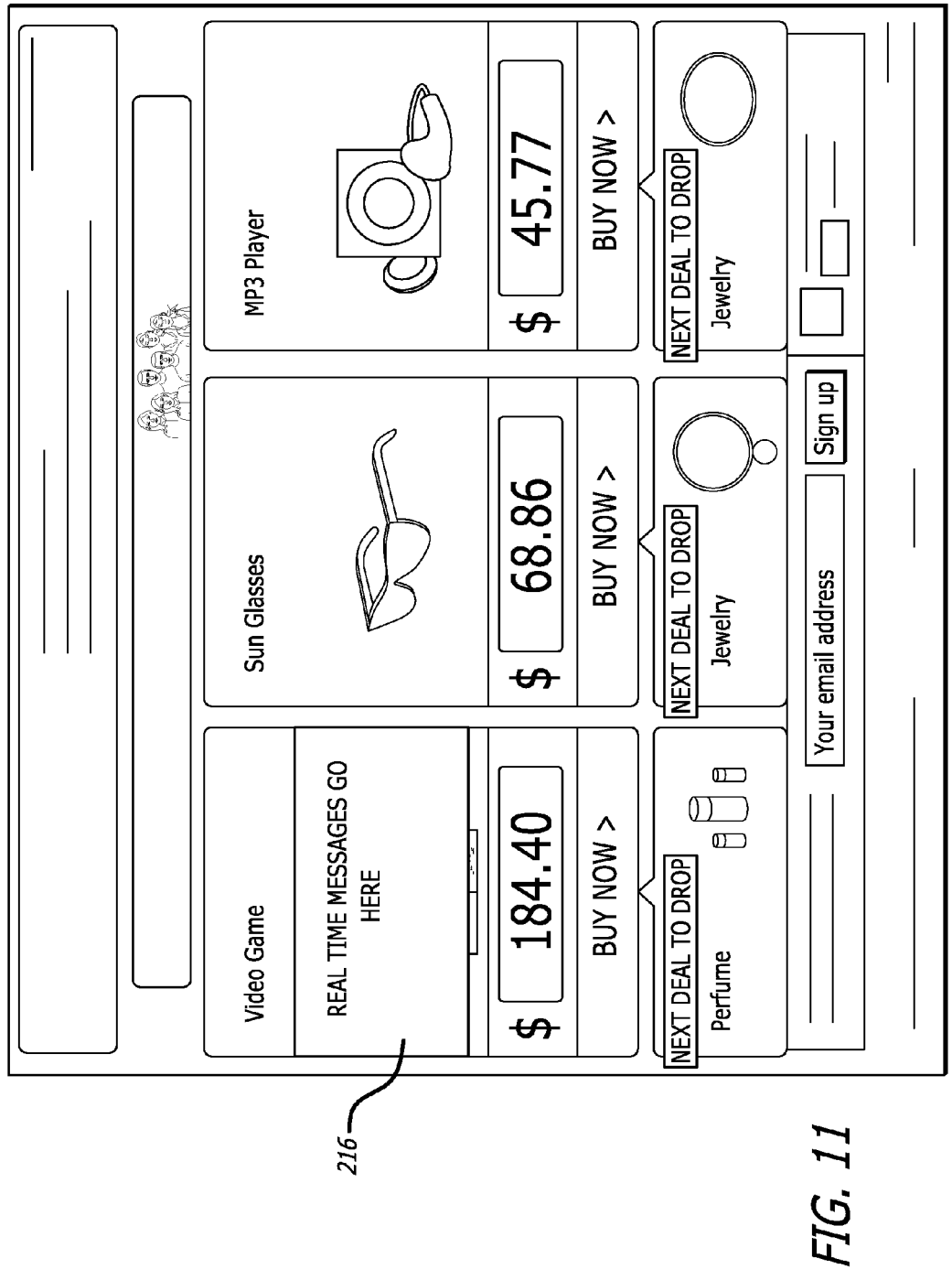

FIG. 11 is a third screenshot of the Peeractive engine at work on an example retail storefront named "Drop Til You Shop."

Figure 12:
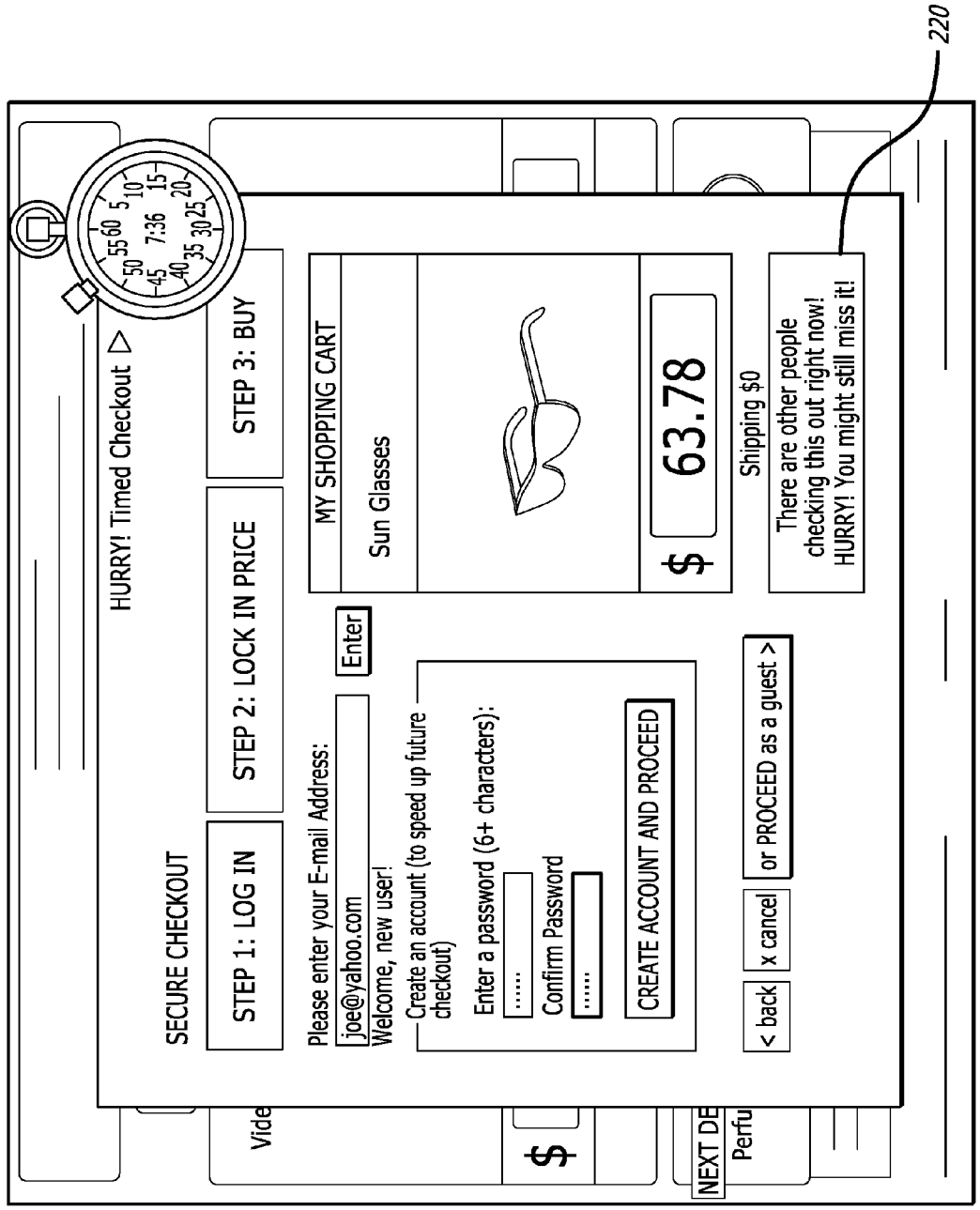

FIG. 12 is a fourth screenshot of the Peeractive engine at work on an example retail storefront named "Drop Til You Shop."

DETAILED DESCRIPTION

The Peeractive engine is a software system where the number of users viewing a website influences the behavior of the site as a result, the experience of all the other viewers of the site. E-commerce is one example of an area that can benefit from the Peeractive system.

Throughout this document, the terms 'site' and 'store' are used interchangeably to describe a website that uses Peeractive technology. Sites based on this technology can also be embedded in other websites and still maintain all of their Peeractive functionality. This usage is referred to herein as an 'embed.'

For the most part, traditional e-commerce fits into two sections: fixed price 'buy now' products, which do not allow for user input into the final price of their purchase, and auctions, which restrict a shopper's ability to buy a product on the spot, thereby reducing impulse purchases. The disclosed process, using the Peeractive engine is a real-time user-generated pricing model that addresses the drawbacks of the two traditional e-commerce shopping methods.

All auctions, (reverse or traditional), require user action to change prices (i.e. a 'bid'). The disclosed system automatically changes prices based on user traffic to a website without any specific action required by the user.

Peeractive Pricing is an e-commerce software application that determines the price of an item based on real time user traffic. A database keeps track of all users looking at an item while an algorithm uses this data to drive prices up or down at an increasing or decreasing rate relative to the number of users on the site.

The Peeractive Pricing system, at its core, does not determine fixed price levels, but rather determines the rate at which prices (or any variables) increase or decrease. Prices are always increasing or decreasing (at varying rates), and it is this rate of increase/decrease that is being determined by user traffic.

The process by which the engine calculates pricing is fully automated. As such there is not necessarily an exact auction-style shopping experience which requires user action in the form of 'bids' to have an effect on pricing.

Simply being a visitor to the site has an effect on pricing. The disclosed system differs from all of the other pricing systems due to the 'real time' nature of the price changes and the passive nature of user interaction (i.e. users do not need to take any direct action to cause a price to change).

The Peeractive engine can be set to have prices increasing or decreasing, and higher/lower levels of traffic will cause prices to increase or decrease at accelerating or decelerating levels. Variables are set in a content management system.

The system also has a unique way of handling how the browser displays price changes. There is a gyroscope effect and acceleration or deceleration of price change can be effected and also indicated in the monitor.

Pricing is just one example of the capability of the Peeractive engine. User traffic can also be used to increase or decrease any quantifiable variable, for instance an item quantity, bandwidth levels, media time etc.

The Peeractive engine system can be used with a reverse auction or conventional forward auction system. The internet interface, such as a graph, clock or other monitor interface provides users online with a measure of Peeractivity, namely the number of other persons visiting the site or a particular page on the site or a particular item on a page. The monitor does not necessarily provide a number of those persons but there can be a scaling effect which is illustrated graphically, and which can be indicative of low to high peer pressure. The higher the Peeractivity levels, the more peer pressure there is on a user. Throughout this document, the term peer pressure and Peeractivity are used interchangeably.

A general outline of the Peeractive ecommerce and auction systems follows.

An online auction system for products and/or services comprises a first database of products and/or services, and a second data base relating and associating price indicia with each of the products and/or services stored at the products and/or services database. There is an initial price indicia associator for receiving products and/or services indicia associated with each of the products and/or services files stored at the products and/or services database. The initial price indicia associator initially prices each of the first products and/or services files with initial price indicia. A price indicia adjuster receives indications of the initial price indicia that said initial price indicia associator associates with each of the products and/or services. It also receives indications of accessing or viewing of the first database or a host of the first data base for each of the products and/or services files. The price indicia adjuster adjusts the initial price indicia responsive to the accessing or viewing and for forming adjusted price indicia associated with each of the first products and/or services.

Pricing is based upon indications of on line access to a website offering products and/or services. Prices are more efficiently set. As demand for the products and/or services changes, the pricing of the products and/or services also changes, dynamically to re-price the products and/or services. The price of the products and/or services is increased or decreased, depending upon increase or decrease changes in user viewing or accessing an e-commerce website. This can be at a changeable rate of acceleration or deceleration.

The first data base is made viewable on a website, and accessing or viewing the website by a user through an internet communication acts to active the price indicia adjuster.

The action by a user is not a positive step to purchase products and/or services.

A user interface on the website is provided whereby access to the website provides the user with an indication of the extent to which others are accessing the website, and thereby provides a measure of peer pressure on the user.

A user interface on the website indicates access to the website and provides the user with an indication of the extent to which others are selectively viewing, purchasing, surfing or otherwise interacting on or with the website, and thereby provides a measure of peer pressure on the user.

The interface includes a scaling meter indicator, and the auction can be a reverse auction.

The initial price indicia with which said initial price indicia associator associates with the products and/or services files is directly related, at least in a stepwise manner, with an historical demand. The price indicia adjuster interactively adjusts the adjusted price indicia associated with each of the first products and/or services files.

The indications of perceived demand for the price indicia adjuster permits the adjustment to the price indicia adjuster at least at successive intervals, dynamically substantially in real time in response to the indications of the perceived. The price indicia adjuster further successively forms the adjusted price indicia responsive to the indications of the perceived demand received at the least of the successive intervals.

The adjusted price indicia formed by said price indicia adjuster incrementally changes prior-formed values of the adjusted price indicia in response to perceived demand. The price adjustment accelerates or decelerates in response to the number of users accessing the site over a predetermined time period.

An online auction method for selling products and/or services comprises having a first database of products and/or services, having a second data base relating and associating price indicia with each of the products and/or services stored at the products and/or services database, associating an initial price indicia for products and/or services stored at the products and/or services database, the initial pricing being of each of the products and/or services files; adjusting the price of the products and/or services in response to accessing or viewing or perceived demand and for forming adjusted price indicia associated with each of the first products and/or services.

The first database is made viewable on a website and accessing or viewing the website by a user through an internet communication acts to activate the price indicia adjuster. The action by a user is not a positive step to purchase products and/or services.

The user interface on the website indicates access to the website provides the user with an indication of the extent to which others are accessing the website, and thereby provides a measure of pressure on the user. The user interface on the website shows access to the website provides the user with an indication of the extent to which others are selectively viewing, purchasing, surfing or otherwise interacting on or the website, and thereby provides a measure of Peeractivity on the user.

The Peeractive Pricing engine as outlined here is one exemplary practical application of how the system is used.

The Peeractive Pricing engine causes the rate of change in prices to increase or decrease in real-time in direct correlation to the number of users viewing a product at any given moment. In simple terms, the Peeractive engine tracks the number of users on a page at any given time, and based on this, uses an algorithm to calculate the rate at which prices will increase or decrease. Prices will be forever moving (up or down), but once a user feels the price on screen matches his or her perceived value of the product, they are able to click 'buy' and secure the product at that price. Users can now be impulsive whilst also having input into the final price of their purchase.

Note that if there is zero traffic on a given website, the rate of change might be zero (depending on how the algorithm is set), and therefore it might appear as though the price is at a fixed level. This is not the case—it just indicates that there is no traffic to drive prices up or down. As soon as a single user views the site, the algorithm will recognize it and it will be reflected by the price beginning to increase or decrease. The price will not simply 'jump' from one level to another level; the price will be 'ticking' upwards or downwards (even just by having one user looking at the site) and in turn it will 'tick' faster or slower based on the amount of users.

In one iteration, the Peeractive Pricing algorithm can be set to only allow prices to decrease. A product can have a relatively high starting price and will decrease continuously—at a rate based on Peeractivity—until it is purchased. Once an item has been sold, the product will either revert to the starting price and begin dropping again (thus giving other users another chance to buy the product they have just missed out on) or move to the next product in the product offering sequence.

The level of Peeractivity is shown to users on a scale; high Peeractivity means a faster downward rate of change in price, however it also indicates that there are more users on the site, and in turn there is increased competition to secure a product at a lower price. If users wait too long to make their purchase, there is an increased likelihood that the product will be snapped up by another user and they will need to try their luck again. Conversely, low Peeractivity occurs when there are fewer users on the site; there is now less chance that a product will be purchased and therefore prices are not allowed to drop at such a rapid rate.

By allowing prices to intelligently respond to changes in demand, the Peeractive Pricing engine can support and be the underlying technology for countless e-commerce processes. A more technical overview of the 'price change' iteration follows.

For the Peeractive engine, there should be a frequent handshaking communication between each browser viewing the site and the server hosting the site.

The Peeractive engine requires frequent communication between two pieces of software: the php-based host application running on the server and the javascript code running in each user's browser. This communication is handled with AJAX calls so that data from the server can guide the operation of the browser without having to reload a page or redraw parts of the page unnecessarily. The php host application stores its data in a MYSQL database and handles all database interaction. While we reference MYSQL here, any database system could be used for this purpose.

The Peeractive engine accurately knows how many users are browsing the site at any given moment. The server can identify and communicate with any browser directly.

Where there are multiple computers in the same location that have the same IP address, this address is usually not a good enough differentiator. The disclosed system assigns each browser a unique id (UID) which is unique even for multiple browsers with the same IP address.

When a browser visits the e-commerce website, the first thing it does is make a call to the Browser-Handler Server to check whether the store is open and, if so, if there is a landing page or if it should just enter the store. The landing page functions as the introduction to the store, providing users with information on how the store works, as well as the ability to login with existing user details or proceed to the store as a guest. The landing page could also be configured to not allow any users to proceed to the store, thereby closing the store if needed. The browser then requests additional information about the store from the server, including which Peeractive product slots make up the store and how often the browser should check in with the server. Then, the browser calls the server to officially 'join' the store, and the server issues the browser a unique identifier (UID). Once the browser has its UID, it requests from the server information about the products currently and next in line for sale in each product slot in the store.

Because the Peeractive system relies on accurately knowing how many browsers are viewing the site at any given time, each browser must 'check in' with regular frequency. This frequency can be set in the 'admin' system. This checking in is handled with a very small AJAX call by the browser, typically less than 1 k. A typical check-in frequency would be once every three seconds.

The message is kept small to avoid overloading the server when many browsers are checking in constantly. In its database, the server maintains a simple counter of how many browsers are currently connected and a table of the unique identifiers the server has assigned to those browsers. Also in this table are the date and time each browser is due for its next check in. When a new browser shows up and is handed its id, the counter and table are updated. If that browser doesn't check in by its next scheduled check in time, the counter is decremented and that id is freed up in the server's table. If the user navigates away from the site, the browser sends a small message to the server to notify it that the browser is abandoning the site.

In one embodiment, there can be two ways the Peeractivity information from the server can affect the user's browsing experience: the Peeractivity meter and the rate of price drop for each product on the page.

The Peeractivity Meter

Peeractivity itself is represented internally by a fractional number between 0 and 1, where 0 is no peer pressure and 1 is maximum peer pressure. Each slot in a store can have its own peer pressure meter or indicator, or the store can have a single, 'unified' peer pressure meter or indicator whose value is derived from one of the slots in the store or a mathematical calculation (e.g. average) involving all the slots in the store. This peer pressure number maps linearly to the position of the pointer in the store's or each slot's Peeractivity meter. The number of active browsers that constitutes maximum Peeractivity is set by an administrator in the server's database. The relationship between the number of active browsers and the Peeractivity number is also set by an administrator in the database. For example, it can be set that between 17 and 39 browsers should map to a Peeractivity level of 0.1 thru 0.25, which could put it into the 'yellow' range on the Peeractivity meter. It is the web browser's responsibility to map the Peeractivity number to the position of the pointer in the Peeractivity meter.

Price Changes

A purpose of the Peeractivity number is to determine the rate of price changes for each of the items currently for sale. In the database, each product has values for: its starting price, its ending price, its rate of change with no Peeractivity (0), its rate of change with maximum Peeractivity (1) and how often its price change should be calculated (in milliseconds). The price is said to be 'dropping', though the numbers can be set so the prices rise instead. The rate of change is made up of two numbers: a dollar amount which can be fractional, and the time interval (in milliseconds) at which the current price of a product should be adjusted by that dollar amount.

Because communication between server and browser happens at a set interval of relatively low frequency (for example, once every 3 seconds), the browser should be able to function between updates from the server in a way that provides a smooth experience for the user. When prices are dropping, the user should see those prices dropping smoothly at the prescribed rate at all times. The browser should be autonomous here, updating the displayed prices without the server needing to send every price update. If, during the occasional communication, the server reports that the Peeractivity or current price have changed, the javascript in the browser should smoothly update the browser to re-synchronize the browser with the server without the user seeing any big jumps.

This browser operates essentially analogous to a spinning gyroscope. With no input from the outside world, the "browser" under gyroscopic type action will continue "to spin" for a long time. Every now and then, when the browser checks in with the server and gets updated stats in return, it is equivalent to physically touching the gyroscope to speed it up or touching it to slow it down. Even though the stimulus is instantaneous, the change in spin speed is gradual, and similarly the "browser" action under server change can be gradual.

Because the browser can nimbly adjust to any drop rates or Peeractivity changes reported by the server, each product is sold at the price the user was expecting when they finally pressed the 'buy now' button. Once 'buy now' is clicked, the accepted purchase price will be transmitted to the server to make sure the customer is charged what they are expecting.

Although the Peeractive system is driven by the number of browsers viewing the site, its architecture allows for more sophisticated control. For example, the server code could be modified to take remaining inventory of a product, time of day, day of the week or other metrics into account while calculating Peeractivity. The preceding iteration is just one example of how Peeractive, and more specifically, Peeractive Pricing, can be utilized.

Through operation of the present disclosure, a system is provided by which it is possible to dynamically price products, services according to browser interaction with server of an e-commerce website for products and/or services. Such interaction can be passive as far as the user is concerned and simply the browsing of a particular website dynamically prices the products and/or services on that site or a related or connected site.

Pursuant to operation of an embodiment of the present disclosure, pricing is based upon user online traffic, for instance persons visiting an on line site. Pricing is preferably independent of user action such as bidding for product or services.

The flow diagrams of the Peeractive engine are described in further detail.

The flow diagrams shown are representative of operation of the present disclosure by which to price products and/or services stored at a products and/or services database and selectably available for purchase, or other use. The products and/or services stored at the database are formed of a plurality of products and/or services files, including a first products and/or services file and at least a second products and/or services file.

For the purpose of this description, the term "Site" refers to any website using the Peeractive Pricing technology. The term "Peer Pressure" refers to a floating point (non-integer) number between 0 and 1 used to convey urgency to users.

Throughout this document, references are made to particular programming languages run on the browser and on the server. The logic of each module could be developed and implemented in other programming languages.

In the current design, Peer Pressure is based on the number of shoppers viewing a slot on a standalone Peeractive-driven Site or in a Peeractive-driven window embedded in another site, though other metrics could be used. If a Peeractive Site or embed has more than one slot but only one Peer Pressure meter, that site is said to have a 'unified peer pressure' which is taken from one of the involved slots or an average of all the slots in the store. A slot can be visible in multiple Sites or embeds, and each Site or embed can contribute to the overall peer pressure with different weight, and this weight can be set in the Peeractive 'admin' system.

Figure 1:
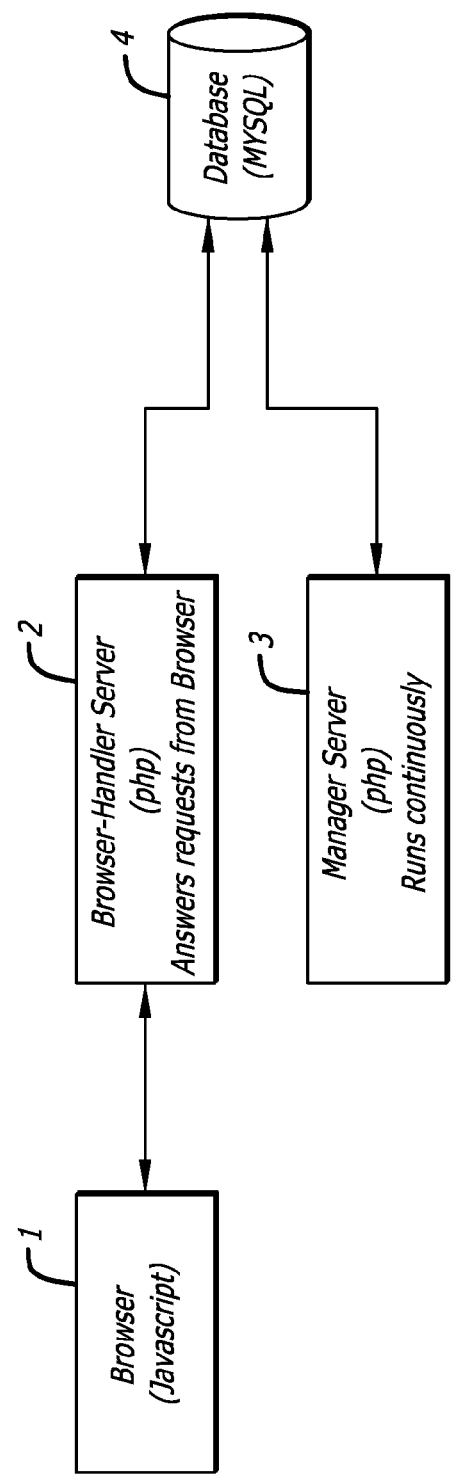
FIG. 1 (System Overview) shows the four main building blocks of the Peeractive Pricing system.

As seen in FIG. 1, Peeractive Pricing relies on communication between four primary software modules: the Browser (1), the Browser-Handler Server (2), the Manager Server (3) and the Database (4).

The Browser (1) is a Javascript application running on the web browser on a user's computer or mobile device. Initially, this software was developed in Javascript, though it could be implemented in any other language a browser would support. All modern browsers are supported and no browser add-ons or plug-ins (e.g. Flash) are required for Peeractive Pricing to work. The Browser (1) communicates with the Browser-Handler Server (2) with the use of asynchronous calls, commonly referred to as AJAX. These calls allow the Browser (1) to request data from the Browser-Handler Server (2) and display that data or otherwise update the user's screen without redrawing the whole page.

The Browser-Handler Server (2) is an application running on one or more publicly-accessible internet-facing server(s). Initially, this software was developed in php, though it could be implemented in any other language a server would support. Its primary purpose is to process requests and return data to Browsers (1). The Browser-Handler Server (2) stores and retrieves data from the Database (4). Initially, this database was a MYSQL database, but Peeractive can work with other database technologies as well. To scale the system for a large number of Browsers (1), the Browser-Handler Server application (2) can be hosted on multiple server computers. They would all store and retrieve data from the same central Database (4).

The Manager Server (3) is an application which runs on a single server computer. Initially, this software was developed in php, though it could be implemented in any other language a server would support. Browsers (1) do not communicate with the Manager Server (3) directly. Browsers (1) communicate with a Browser-Handler Server (2) which stores and retrieves data from the Database (4). The Manager Server (3) can communicate directly with the same Database (4). The main purposes of the Manager Server (3) are to keep track of the number of active Browsers (1) using the Site at any given time, determine which products are the 'current' or 'next' products for sale in a slot, calculate up-to-the-moment current prices for all items currently for sale on a Site, calculate the current Peer Pressure on a Site, and return un-paid sales items to inventory. Note: As long as the Browser-Handler Server (2) and the Manager Server (3) have access to the same Database (4), they can be run on the same or different server computers.

Throughout this document, references will be made to the 'admin' system. This is a Javascript-driven website that can communicate with the Browser-Handler Server (2) and the Manager Server (3) to let system administrators control the Peeractive system.

Throughout this document, the terms Site and Store should be considered interchangeable.

The Browser: As stated earlier, The Browser (1) is a Javascript application running on the web browser on a user's computer. All modern web browsers are supported and no add-ons or plug-ins (e.g. Flash) are required for Peeractive Pricing to work.

The Browser (1) frequently communicates with the Browser-Handler Server (2) with the use of asynchronous calls, commonly referred to as AJAX. The 'admin' system can set the frequency of these calls. These calls allow the Browser (1) to request data from the Browser-Handler Server (2) and display that data or otherwise update the user's screen without redrawing the whole page.

The Browser (1) needs to maintain a realtime communication with the Browser-Handler Server (2). Each time the Browser (1) makes a call to the Browser-Handler Server (2), it needs to receive a response within a certain time period, configurable in the 'admin' system. This response will contain, in JSON-encoded format, a combination of requested data, an array of errors, or a status array.

For this document, calls made by the Browser (1) to the Browser-Handler Server (2) through this mechanism will be referred to simply as a "Call" or "Calls". The mechanism for these Calls is detailed in FIG. 5 and explained below. Each Call involves an AJAX function name, and those will be notated as follows: (ajax_function_name)

Figure 2:
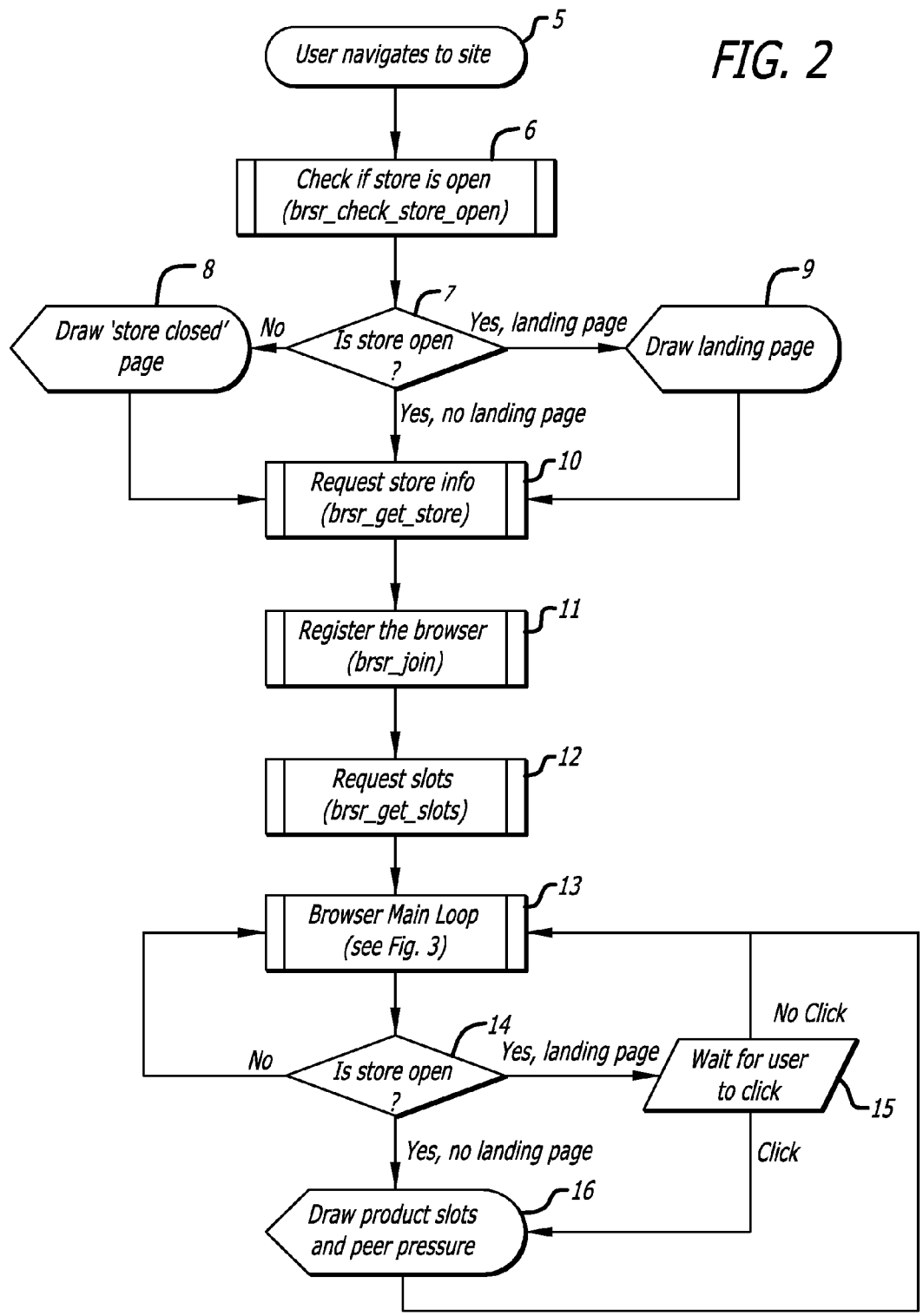
FIG. 2 (Browser Startup) shows the Javascript-based routine that a browser runs when it enters a Peeractive site.

Browser Startup (FIG. 2): Each Peeractive-driven site or embed has a Store identifier in its config.js file. When a user navigates to a Site (5), the Browser (1) makes a Call (brsr_check_store_open) to the Browser-Handler Server (2) which includes this Store identifier to check if the Store is open for business (6). FIG. 6a shows how the Browser-Handler Server (2) processes this Call.

The Browser-Handler Server (2) will respond to this Call (6) with information about whether the Store is open or closed and, if open, if there is a landing page or not (7). If the Store is closed, the Browser displays an image to that effect (8), the URL of which can be set in the 'admin' system. If the Store is open and a landing page is enabled, then the landing page image, the URL of which can be set in the 'admin' system, is displayed (9) along with an 'Enter' button that the user can click to enter the Store (15). If the Store is open and no landing page is enabled, then the Product Slots are displayed once initialization is complete (16).

Regardless of whether the Store is open or closed, or, if open, if there is a landing page or not, the Browser (1) continues to establish communication and join the Store. The Browser (1) makes a Call (brsr_get_store) to the Browser-Handler Server (2) to get more information about its assigned Store (10). FIG. 6b shows how the Browser-Handler Server (2) processes this Call.

The Browser (1) then makes a Call (brsr_join) to the Browser-Handler Server (2) to join the store and receive a UID, a unique Browser identifier (11). FIG. 6c shows how the Browser-Handler Server (2) processes this Call.

Once the Browser (1) has its UID, it makes a Call (brsr_get_slots) to the Browser-Handler Server (2) to get the Product Slots for its assigned Store (12). FIG. 6d shows how the Browser-Handler Server (2) processes this Call. As a response to this Call, the Browser (1) will receive information about the products currently for sale on the Site, including the current price and rate and direction of price change for each product.

Figure 3:
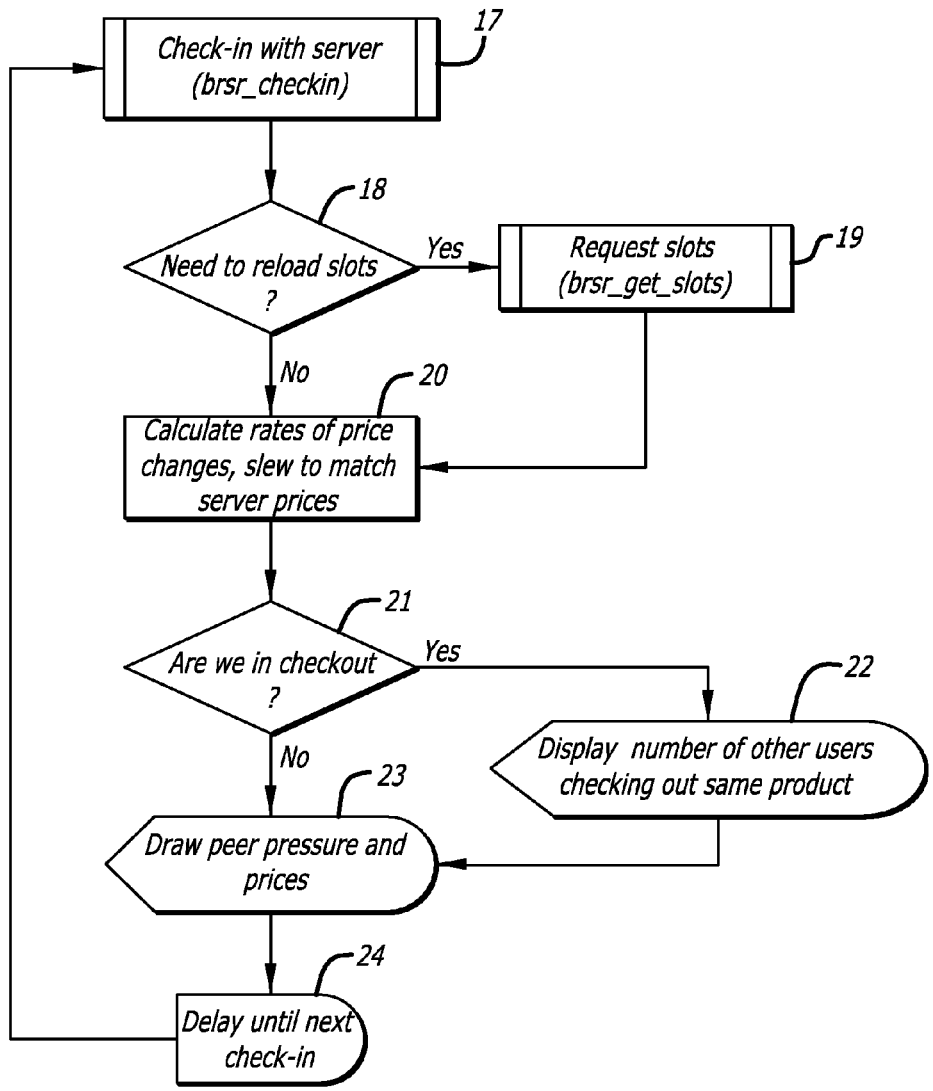
FIG. 3 (Browser Main Loop) shows the Javascript-based loop that a browser enters once it has completed the startup procedure in FIG. 2.

The Browser (1) then enters its main functional loop (13) which is diagrammed in detail in FIG. 3.

Figure 6E:
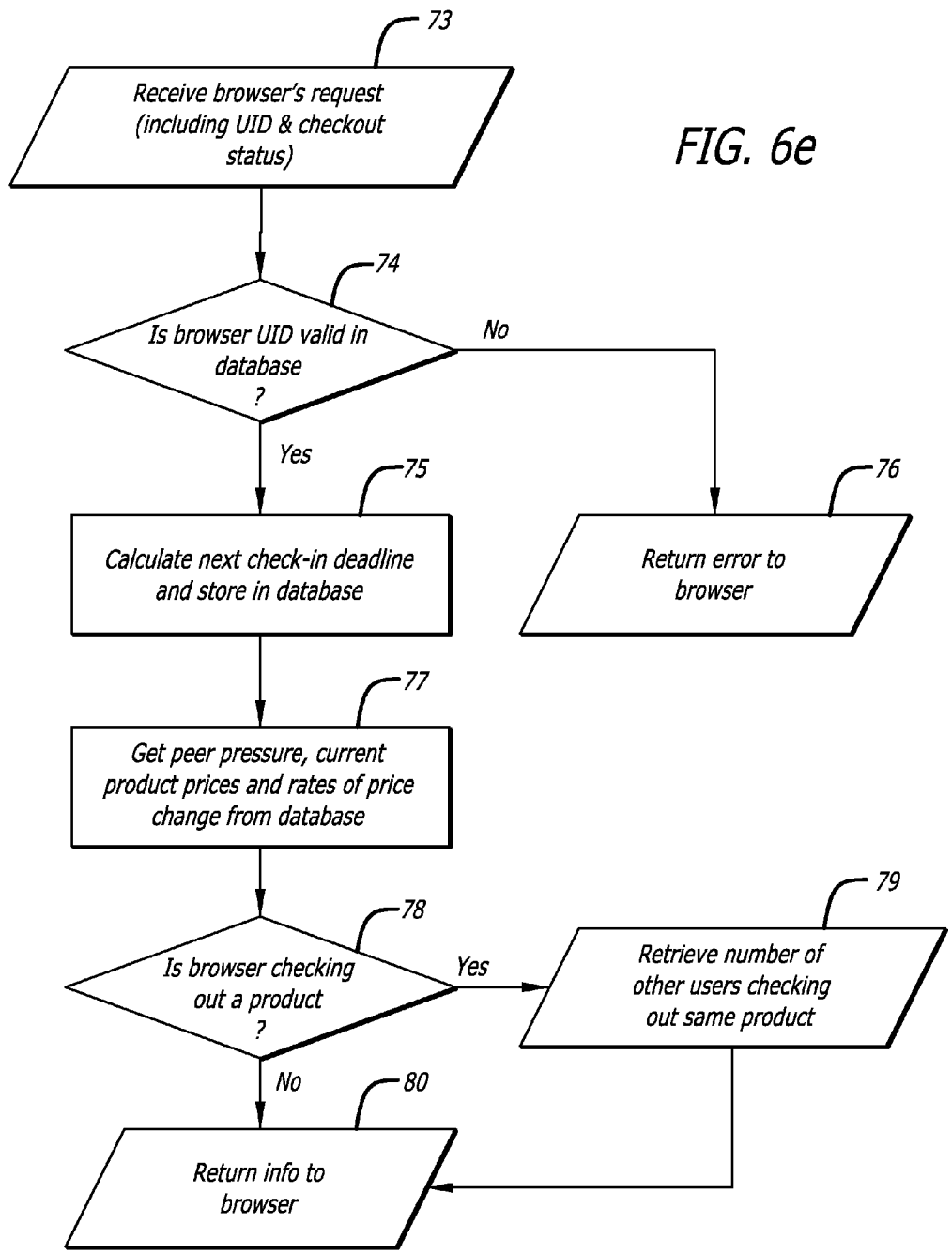
Figure 6F:
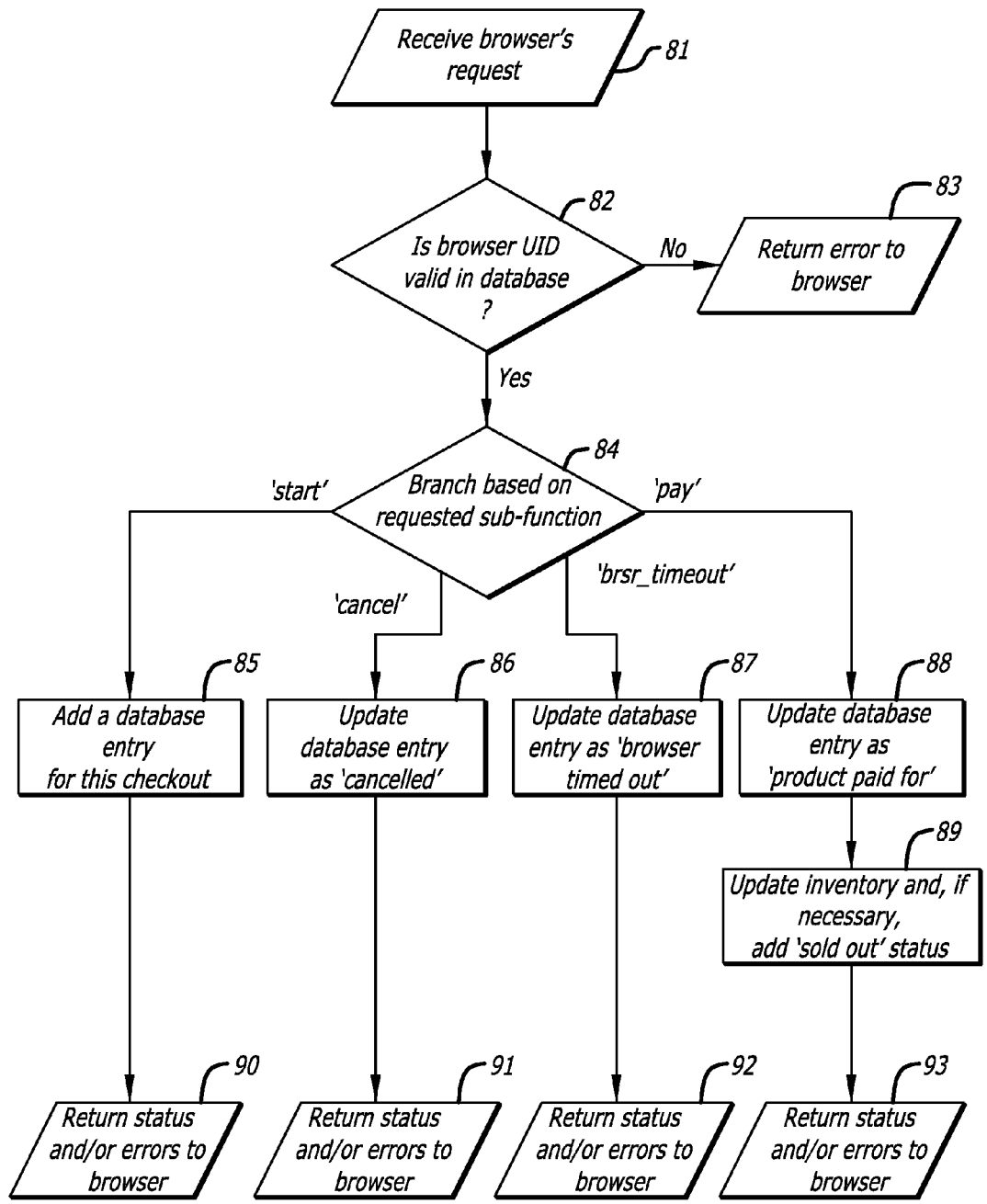
Figure 6G:
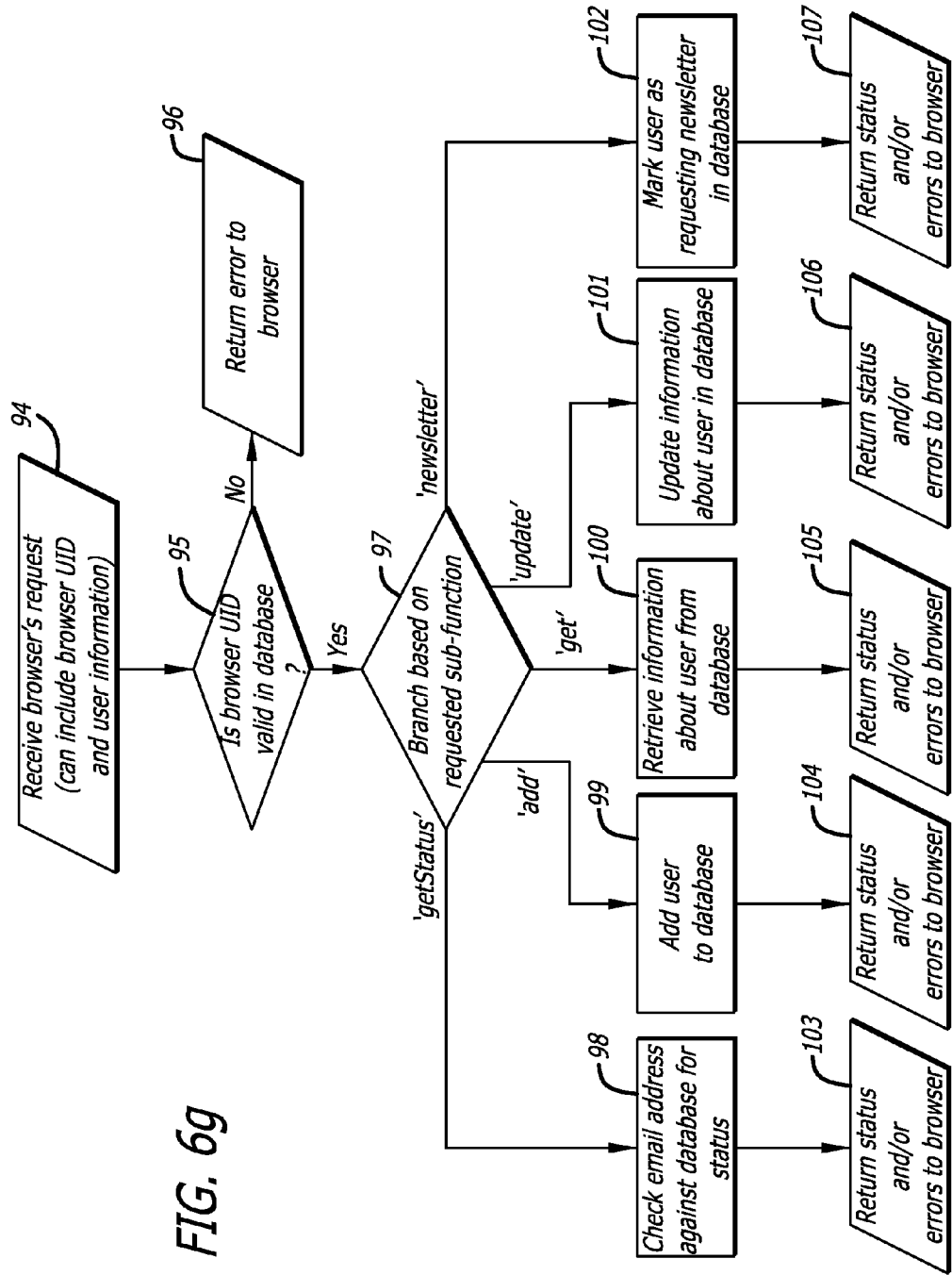

Description of FIG. 3—Browser Main Loop: The Browser (1) makes a Call (brsr_checkin) to the Browser-Handler Server (2). FIG. 6e shows how the Browser-Handler Server (2) processes this Call. In response to this Call, the Browser (1) will receive a combination of product pricing including rate and direction of price change, the current Peer Pressure for each Product Slot, how many users are currently checking out this product, an array of errors, and a status array.

If the status array tells the Browser (1) that it needs to reload the Product Slots (18), the Browser (1) makes a Call (19) to do this.

If the user is currently checking out a Product (21), the number of other users checking out the same product is displayed (22).

Once the Browser (1) has the current pricing and rate and direction of price change for each product currently for sale, it calculates (20) and displays (23) accurate pricing for each product continuously until the next server checkin Call (brsr_checkin) (17).

The Browser (1) also updates the Peer Pressure display for each slot or, if the individual slots don't have peer-pressure displays, a Store-wide unified Peer Pressure display (23).

After a delay as set in the 'admin' system (24), the loop restarts (17).

If the Store is open and the user is not on the landing page, the Browser (1) displays the products currently for sale, their prices changing over time, and the Peer Pressure for each slot or the unified Peer Pressure for the Store (16).

When the user wants to see more information about a Product, they can click a button to see the product specs and media (photos, videos, etc.) which are returned by the brsr_get_slots Call (12 or 19).

Figure 4:
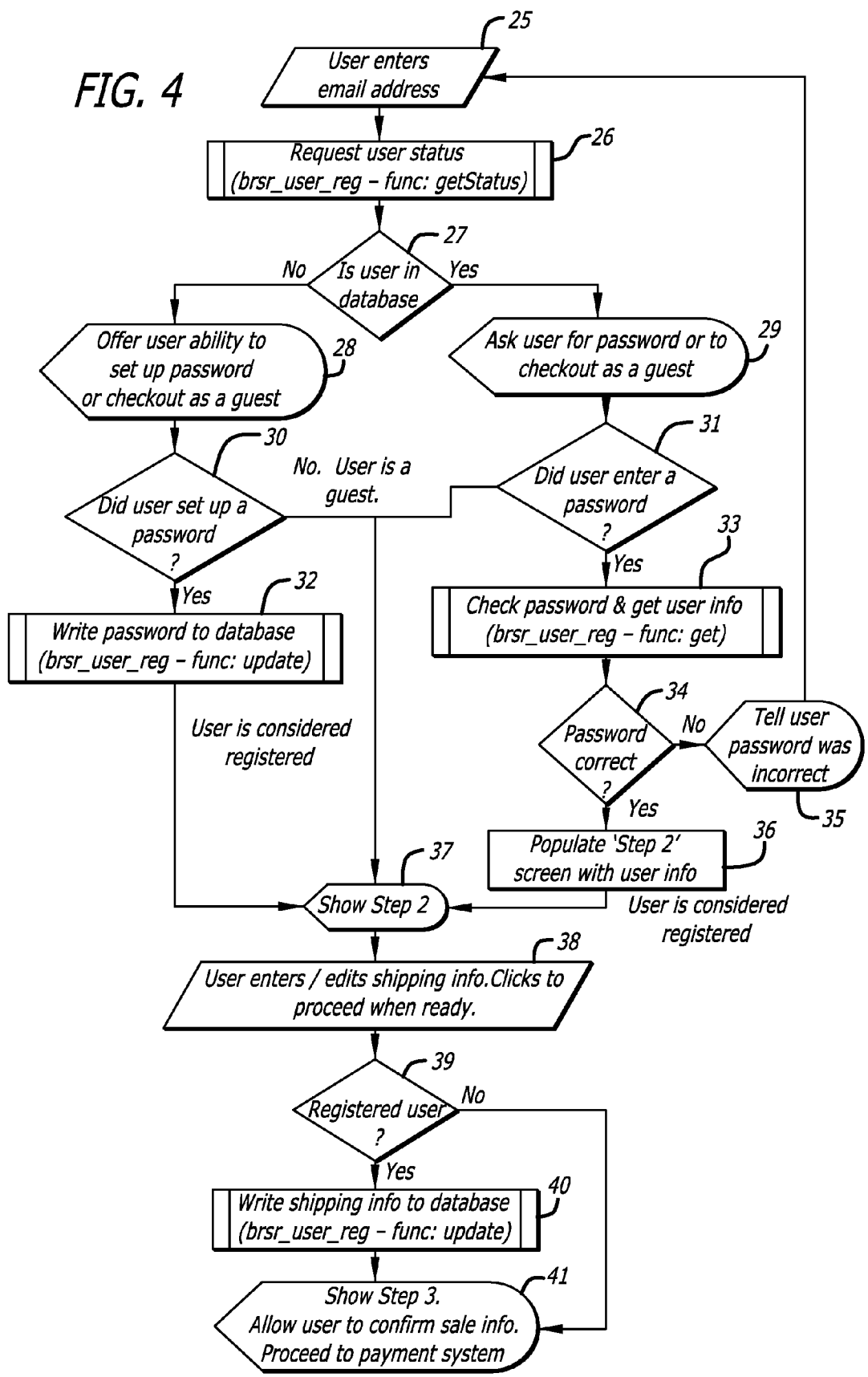
FIG. 4 (Browser Checkout Product) shows the Javascript-based procedure that is followed when a user checks out (purchases) a product.

The process of registering users and purchasing products can be implemented in many ways. The following is a description of how it is implemented in Drop Til You Shop, the first store based on the Peeractive Pricing system:

When the user wants to purchase a product, they click the 'Buy Now' button in the Slot for that Product. This takes them into Step 1 of an integrated checkout/user registration system which is detailed in FIG. 4. Based on settings in the 'admin' system, the price can be set to lock at any one of a number of stages in the checkout process. Until that 'lock point' is reached, the price will continue to change as it does on the 'main' screen. The Browser (1) continues to execute the Browser Main Loop (FIG. 3) while the user is checking out. The checkin calls (17) also notify the Browser-Handler Server (2) that the user is purchasing a product. If the product sells out before the user can complete checking out, the user is notified and the sale is cancelled.

Step 1 of the checkout procedure starts by asking for the user's email address or other login details (25). The Browser (1) then makes a Call (brsr_user_reg, subfunc: getStatus) to the Browser-Handler Server (2) to see if this email address is already in the database (27). If it is not, the user is offered the ability to register a password or checkout as a guest (28). If the email does have an associated password in the database, the user is asked to enter this password or checkout as a guest (29). The user is told that it will be faster to checkout by entering their password because all of their personal information will be pulled from the database instead of needing to be re-entered.

If an unregistered user decides to register a password (30), that password is written to the database (32) with a Call (brsr_user_reg, subfunc: update). If a registered user enters a password (31), it is checked against the database with a Call (brsr_user_reg, subfunc: get) (33) and, if correct (34), their registered information is retrieved and the checkout screen is populated with their information (36). If the password is not correct (34), the user is alerted (35) and asked to try again.

Once the email, password, and status (guest or registered) is established, the user is taken to Step 2 (37) to enter, or if they had previously registered, confirm, their shipping information (38). If they are a registered user, their shipping information is updated in the database via a Call (brsr_user_reg, subfunc: update) (40) before proceeding to Step 3 (41).

On Step 3 (41), the user can confirm all the information relating to the sale before proceeding to the payment processor.

Browser Requests From Browser-Handler Server (FIG. 5):

As mentioned earlier, all calls from the Browser (1) to the Browser-Handler Server (2) are handled through a common interface. The Browser (1) makes a call which specifies a function name and any other information the Browser-Handler Server (2) will need to service the call (42). The Browser (1) then waits for a response (43). If no response is received (45), and the Browser (1) has not retried the communication more times than its prescribed retry count (44), it tries the call again (42). If the retry count has been exceeded (44), the user is presented with a 'timeout' message (47) and the system stops (49), forcing the user to reload the page.

If the Browser (1) receives a response from the Browser-Handler Server (2) that includes errors (45), the Browser (1) displays the errors (46), determines if the system can continue operating (48), and either tries the call again (42) or stops the system (50), forcing the user to reload the page.

If the Browser (1) receives a response from the Browser-Handler Server (2) with no errors (51), it needs to parse the data. The data can contain pricing and rate of price change information for each Product Slot, but also store-wide or other slot-wide status information. For each piece of information received, the Browser (1) must figure out the target for the information (52). If the target is the Store, then the Browser's Store data object is updated (53) and Store-related status messages are processed (56). If the target is a Product Slot, then the Browser's Slot data object is updated (54) and Slot-related status messages are processed (57). If the target is the Browser (1) itself, then the Browser's information is updated (55) and Browser-related status messages are processed (58).

Here are some examples of status messages and their potential targets. This is not a complete listing of all potential status messages:

Store:
Open Store
Close Store
System Status
Product Slots:
Time Low
Time Critical
Quantity Low
Quantity Critical
Sold Out
In Countdown
End Countdown
Info
Alert
Browser:
Info
Alert
Invalid UID The messaging system within the Peeractive technology is capable of conveying much more than simple status information. In fact, it can support a practically unlimited number of message types. For example, the messaging system could carry advertising to users, and because of its targeting capability, send unique advertising to a given store, product slot, or even a single browser based on its UID. This advertising could be in any browser-supported format, including text, images, Flash, or even video. The browser can use the same targeted messaging system to allow the user to respond to or act on these ads or other messages. Furthermore, the messaging system can display real-time messages as noted above within a slot, store, embed, or other places where the Peeractive technology is being used.

The Browser-Handler Server (FIG. 6):

As stated earlier, the Browser-Handler Server (2) is a php application running on one or more publicly-accessible internet-facing server(s), but could be implemented in any language supported by the server. Its primary purpose is to process requests and return data to Browsers (1). The Browser-Handler Server (2) stores and retrieves data from the Database (4). To scale the system for a large number of Browsers (1), the Browser-Handler Server application (2) can be hosted on multiple server computers. They would all store and retrieve data from the same central Database (4).

The Browser-Handler Server (2) can process seven basic kinds of requests from Browsers (1). When a Browser (1) makes an AJAX call to the Browser-Handler Server (2), it includes a function identifier to determine the type of call and the Browser's (1) UID if it has been assigned one previously.

The Seven Functions

Function: brsr_check_store_open (FIG. 6a):

When the Browser-Handler Server (2) receives this request (59), it retrieves the 'store open' and 'landing page' status, including 'store closed' and 'landing page' image URLS, from the Database (62) and returns it to the caller (65).

Function: brsr_get_store (FIG. 6b):

When the Browser-Handler Server (2) receives this request (60), it retrieves information about the requested Store from the Database (63) and returns it to the caller (66).

Function: brsr_join (FIG. 6c):

When the Browser-Handler Server (2) receives this request (61), it generates a unique Browser identifier (UID) (64) and stores it and the Browser's (1) IP Address in the Database (4) along with the date and time the Browser must check in by to be considered still active. The Browser-Handler Server (2) then returns the UID to the caller (67).

Function: brsr_get_slots (FIG. 6d):

When the Browser-Handler Server (2) receives this request (68), it first checks to make sure the unique Browser ID sent in the call is registered in the Database (4) (69). If not, an error message is sent back to the Browser (1) (72). The Browser-Handler Server (2) then retrieves the Product Slot info based on the Store the Browser's UID is registered to (70) and returns this information to the caller (71).

Function: brsr_checkin (FIG. 6e):

When the Browser-Handler Server (2) receives this request (73), it first checks to make sure the unique Browser ID sent in the call is registered in the Database (4) (74). If not, an error message is sent back to the Browser (1) (76).

The Browser-Handler Server (2) then uses the system-wide 'check in frequency' setting to calculate when the Browser (1) must next check in to continue to be considered active and stores this new check-in time in the Database (75). The Browser-Handler Server (2) then loads the current Peer Pressure from the Database (4) as well as the current prices and rate of price change of the products currently for sale (77).

If the Browser (1) indicated in the Call that the user is checking out a Product (78), the Browser-Handler Server (2) polls the Database to find out how many other users are checking out the same product (79). This number is bundled with all the other information being assembled.

The information is returned to the caller (80).

Function: brsr_checkout (FIG. 6f):

When the Browser-Handler Server (2) receives this request (81), it first checks to make sure the unique Browser ID sent in the call is registered in the Database (4) (82). If not, an error message is sent back to the Browser (1) (83). The function can receive one of four subfunctions (84):

Subfunction 'start':

The Browser-Handler Server (2) generates a unique id for this checkout and registers this in the Database (4) (85). It then returns this checkout id and any status or error messages to the caller (90).

Subfunction 'cancel':

The Browser-Handler Server (2) updates the Database (4) to consider this checkout cancelled (86) and returns any status or error messages to the caller (91).

Subfunction 'brsr_timeout':

The Browser-Handler Server (2) updates the Database (4) to consider the Browser (1) to have timed out during checkout (87) and returns any status or error messages to the caller (92).

Subfunction 'pay':

The Browser-Handler Server (2) updates the Database (4) to consider this checkout completed and the Product as 'paid for' (88). Product inventory in the Database (4) is updated and, if necessary, a 'sold out' status is generated (89). Status and error messages are returned to the caller (93).

Function: brsr_user_reg (FIG. 6g):

When the Browser-Handler Server (2) receives this request (94), it first checks to make sure the unique Browser ID sent in the call is registered in the Database (4) (95). If not, an error message is sent back to the Browser (1) (96).

The function can receive one of five subfunctions (97):

Subfunction 'getStatus':

The Browser-Handler Server (2) checks the registration status of the Browser-supplied email address (98) against the Database (4) and returns this status and additional status or error messages to the caller (103).

Subfunction 'add':

The Browser-Handler Server (2) adds the Browser-supplied email address to the Database (4) (99) and returns any status or error messages to the caller (104).

Subfunction 'get':

The Browser-Handler Server (2) retrieves user information from the Database (4) based on the Browser-supplied email address (100) and returns this information and any status or error messages to the caller (105).

Subfunction 'update':

The Browser-Handler Server (2) updates the user information in the Database (4) with data sent from the Browser (1) as part of the Call (101). Any status or error messages are returned to the caller (106).

Subfunction 'newsletter':

The Browser-Handler Server (2) adds (if the Browser-supplied email address has not been previously registered) or updates the user's record in the Database (4) to be put on the newsletter list (102) Any status or error messages are returned to the caller (107).

The Manager Server (FIG. 7):

As stated earlier, the Manager Server (3) is a php application which runs on a single server computer. It could be implemented in any language supported by the server.

The Manager Server (3) runs in a continuous loop (108). It interacts with the same Database (4) as the Browser-Handler Server (2).

At the beginning of each operational cycle, the Manager Server (3) scans the Database (4) looking for Browsers (1) for expired items (109). These can be Browsers (1) which have not checked-in by the time they were supposed to, or Product checkouts or system status messages which have expired. These expired items are removed from the database (4) (110). Then, the total number of active Browsers (1) is recalculated and stored in the Database (4) (111).

At this point, the Manager Server (3) calculates the Peer Pressure for the Site and stores it in the Database (4) (112). The Peer Pressure can be based a single or multiple metrics, such as, as an example, the number of users currently viewing a Product Slot and a relative weight assigned to each Store which shows that Slot.

The Manager Server (3) also determines what Product from within a Product Slot's Sequence (as set up in the 'admin' system) is considered the 'current' or 'next' Product for sale in that Slot (113). This is detailed in FIG. 8 and a description follows:

Description of FIG. 8—Sequence Product Selection:

In the 'admin' system, an administrator sets up a Sequence of Products to be sold in a Product Slot. Each item in that Sequence is referred to as a Sequence Item. To first determine the 'current', and then the 'next' Product for sale in a Slot, the Manager Server (3) starts by pointing to the beginning of the Sequence (117). It then advances through the Sequence Items (118), looking for reasons to eliminate a Product from selection as the 'current' Product for sale. It runs through a list of tests: Is there another Sequence Item to evaluate in the Sequence? (119) Has the Product Slot been manually stopped by an administrator? (120) Is the Product in the Sequence Item being considered sold out or has a sub-quantity (lot) been sold out? (121) Has the Product in the Sequence Item being considered reached its target price? (122) Has the Sequence Item run longer than its programmed duration? (123)

If any of the above conditions are true, the Manager Server (3) moves on to the next Sequence Item (118).

If a Sequence Item doesn't meet any of the above criteria, it is considered to contain the 'current' Product. If this 'current' Sequence Item does not indicate that it is in a countdown (until the start of a sale) (124), the Manager Server (3) checks to see, based on the Sequence information, if it needs to generate any status messages regarding the remaining time of a sale or quantity of a product (125).

If the Manager Server (3) has selected a 'current' Product (126), it then follows the same procedure to try to determine a 'next' Product (127).

All applicable Product information as well as any status or error messages are returned to the caller (128).

Once the product(s) have been selected, the Manager Server (3) calculates the current prices and rate of price changes of the items currently for sale (114), and stores them to the Database (4) (115). The rate of price change is dictated by Peer Pressure and a rate range entered for each Product in the 'admin' system, and the current prices are calculated with high precision based on the time that has passed since the prices were last calculated.

The Manager Server (3) calculates Peer Pressure based on a formula. In the 'admin' system, an administrator can set how many browsers viewing a slot or site (BrsrPPMin) represent no Peer Pressure (0) and how many (BrsrPPMax) represent maximum Peer Pressure (1). Based on the number of browsers currently viewing a slot or site (BrsrCount), Peer Pressure is calculated as follows: Peer Pressure=(BrsrCount−BrsrPPMin)/(BrsrPPMax−BrsrPPMin) Negative values are changed to 0 and values above 1 are changed to 1. The system could also be adapted to allow the administrator to specify the minimum and maximum number of browsers for each color range in the Peer Pressure meter for a slot or site. It would then be the responsibility of the browser to display each range in the meter appropriately.

The Manager Server (3) calculates the rate of price change for a product based on a formula. In the 'admin' system, an administrator can, for a product, set a starting price, an ending price, a rate of price change (RateMinPP) when there is no Peer Pressure (0) and a rate of price change (RateMaxPP) when there is maximum Peer Pressure (1). The rate of price change is calculated as follows:

RateOfPriceChange=(Peer Pressure*(RateMaxPP−RateMinPP))+RateMinPP.

If the ending price for a product is lower than the starting price, then the RateOfPricechange is then multiplied by −1.

After a delay (116), the Manager Server (3) starts over (109).

In the screen shot of FIG. 9 there is:

Alerts 200. These messages can be configured in the admin system to show an alert when the quantity of an item reaches a certain threshold, or when the time limit for the product sale reaches a certain point.

Buy Now Buttons 202. The Buy Now buttons will change color relative to the Peeractivity meter. For example, if the Peeractivity meter shows the current traffic as moderate (i.e. the people icon are in the orange zone), the Buy Now buttons will all change color to orange. This makes it easier for users to quickly see how much traffic there is on a site.

Peeractivity Meter 204. The Peeractivity meter represents the amount of live traffic on the website at any given time. The different color levels and associated people icon indicate the degree of traffic from low to high. The people icon moves back and forth dynamically without the need for a browser refresh. As more unique users enter and exit the site, the people icon will be moving constantly and smoothly to its relevant level.

Live Prices 206. The prices in all three boxes will drop at a rate determined by the peer pressure system, i.e. how many unique browsers are visiting the site at any given time. For example, if there is a high level of unique browsers, the prices will descend at a faster rate. Conversely, if there are few users on the site, the price will drop at a much slower rate.

In the screen shot of FIG. 10 there is:

Product Info 208. This button allows a user to get more information about a particular product, including but not limited to model numbers, parts, accessories included, package contents, colors, etc.

Newsletter Signup 210. This allows users to enter in their email addresses to signup for a newsletter, information emails, etc.

Buy Now & Peeractivity Meter 212. In this example, the Peeractivity is high as indicated by the people icon being in the Red zone, and the Buy Now buttons having changed to red color.

Social Media Plugin 214. This allows for integration with third-party social media platforms, including but not limited to Facebook, Twitter, etc. A user could "Like" a product sale, post their successful sale on their Facebook wall, invite their friends to participate in a sale, share their purchase price with their friends so that they can also purchase said product at the same price for a limited time, etc.

In the screen shot of FIG. 11 there is:

Real Time Messages 216. The system has been built to allow for real-time messages to be displayed at any point during a sale. Messages could include special promotions, free prizes/giveaways, announcement of who won the previous sale, instructions, targeted advertising, etc. This message could be in the form of text, images, video, flash, etc. and could also be interactive with the user and responsive to the peer pressure meter.

In the screen shot of FIG. 12 there is:

Step 1 of the checkout process is where a user can login via their existing account (if they have one), create a new user account, or checkout as a guest. The price can be locked once a user hits Buy Now, or the price could be set to continue to drop during this phase.

Step 2 of the checkout process allows a user to enter in their shipping details and contact information and lock-in the price, if the price has not already been locked (e.g. static).

Step 3 of the checkout process allows a user to review their purchase details, including item, final price, shipping details, and shipping costs. The user can then Buy the product at which point they are redirected to a payment screen.

The checkout process is timed, limiting how quickly a user must checkout and secure their product. This is to further increase peer pressure during the buying process.

Other Users During Checkout 220. The system keeps track of how many users are currently in the checkout process for a particular product, and will display this information to further increase the peer pressure for the shopper.

The products and/or services are priced more efficiently than that permitted by conventional pricing mechanisms.

Pricing of the products and/or services need not be based merely upon anticipated levels of demand or upon industry norms that price products and/or services merely at normative pricing levels. Dynamic pricing of the products and/or services is permitted, thereby selectably to re-price the products and/or services as demand for the products and/or services changes.

In one aspect of the present disclosure, when potential demand, as defined by the accessing of a web site displaying the products and/or services increases, for example, the pricing of the products and/or services is selectably increased, better to maximize revenues when demand for the products and/or services is high. When demand, as defined by the accessing of a web site displaying the products and/or services decreases, a decrease in the pricing of the products and/or services is implementable. Re-pricing, as defined by a movable and/or changeable price of the products and/or services also facilitates maximization of other criteria, such as sales volume and profit. Eventually a re-pricing is achieved which effective to cause a buyer to actual bid or buy now and hence consummate a purchase.

In one aspect of the present disclosure, a database is maintained at which products and/or services files are stored. The products and/or services files each form a digital representation of a specific product and/or service. The products and/or services files are, for instance, in a selected format, such as a pdf, jpeg, MP4, AVI or MP3 format. Each products and/or services file is identified by products and/or services indicia, such as the name of the manufacturer or provider of the products and/or services of the products and/or services file. The products and/or services files stored at the database are indexed by the products and/or services indicia associated therewith, and the database is searchable. The products and/or services indicia, in one implementation, further identifies the products and/or services file by a name that also is indexable pursuant to operation of an embodiment of the present disclosure.

In another aspect of the present disclosure there can be a historical database with indicia identifying, for instance, a prior sales history of other products and/or services. The prior sales history is represented, for instance, in the form of a categorization of prior sales. A products and/or services creator is categorized in one of a selected number of categories based upon prior sales history of the other products and/or services created by the products and/or services provider.

The historical indicia is used, for instance, to initially price products and/or services provided and stored at the products and/or services database. A products and/or services provider that exhibits a history of significant levels of sales of other products and/or services is initially accorded a categorization identifying the products and/or services creator's prior sales success.

The initial price for the products and/or services files is responsive to the historical indicia or input by an administrator. The initial price associated with the products and/or services is adjusted responsive to demand for the products and/or services or by input from an administrator.

A price indicia adjustor adjusts the price associated with the products and/or services files responsive to the perceived demand as defined by the accessing of a web site displaying the products and/or services. The perceived demand as so defined is one implementation. This can comprise simple passive access to a website or inquiries regarding the availability of the products and/or services. In another form, the requests for the products and/or services comprise requests for purchase the products and/or services. In another form, the requests for the products and/or services comprise actual purchases of, or other monetary transactions associated with, the products and/or services. These perceived demands are exhibited on the website interface in some form so that others accessing the website can be aware of the pressure to sell the product and/or service.

Indications of the requests for the products and/or services, or real time viewers, are provided to the price indicia adjustor on a real-time basis and shown on the interface for users accessing the website. As the perceived demand, directly or indirectly by potential buyers or surfers of the site occurs the price indicia adjustor receives indications of the requests or traffic levels and adjusts the prices of the products and/or services files responsive thereto. The adjustments made by the price indicia adjustor are, in one implementation, incremental. This can also be requests for, or viewers looking at, the products and/or services, or absence of requests for, or viewers looking at, products and/or services, within a selected time interval are used to adjust upwardly or downwardly the price associated with the products and/or services.

The incremental changes can be step-wise changes when selected thresholds of requests or viewers, or absence of requests or viewers, are made within a selected time period. The adjustments are dynamically made essentially in real time, responsive to quantifiable indicia of the perceived or possible demand for the products and/or services. As such more accurate pricing of the products and/or services, provides better profit, distribution, sales, or other criteria.

Additional criteria can be used to adjust the price. For instance, the delivery mechanism by which the products and/or services can be used to perform price gradations at a particular demand level. For instance, a products and/or services file is priced at a first price gradation when the products and/or services file is to be delivered to a products and/or services consumer by way of a first delivery mechanism. The same products and/or services file is priced at a second price gradation when the products and/or services are to be delivered to a products and/or services consumer by way of another delivery mechanism. Other gradations price the same products and/or services differently depending upon the consumer. For instance, if the consumer is a non-commercial consumer, such as an individual, the products and/or services is priced at a gradation that differs with the pricing gradation of the products and/or services that is to be delivered to a commercial products and/or services consumer.

Additionally, adjustments made by the adjuster at selected intervals, such as at periodic intervals or at intervals defined by perceived demand changes reaching selected thresholds. The products and/or services are priced dynamically and based upon perceived demand as indicated and defined above. The price adjustments maximize performance criteria, such as to maximize profit, to maximize sales, or other criteria.

This technology can be embedded on other websites, including publisher/content sites (such as cnn.com, etc.) as a banner ad. The technology would still work with the same functionality if embedded on other sites. This permits this technology to be used broadly, and/or for publishing banner ads with Peeractive price sales. Furthermore, the web traffic can be aggregated from all sites using the Peeractive technology, and each site could have a different Peeractivity weighting. Selectively the web traffic aggregation is permitted in real-time across preferably all sites where the online system is being used/published.

Further there is a real-time messaging aspect to the technology. The system can display a number of alerts based on predetermined thresholds (i.e. low quantity, low time, etc.), status messages, and targeted messages to users. This permits the display of targeted advertising messages within a store/slot.

The rate at which the price changes can be higher or lower based on more or less users on a site. In other words, there are at least four types of uses: 1) Higher rate of change based on more users 2) Higher rate of change based on less users 3) Lower rate of change based on more users, and 4) Lower rate of change based on less users.

While the system, apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures.

For instance, the following are alternative uses whereby the Peeractive engine changes variables other than pricing.

Peeractive Value (Aka "Added Value")

Where real time traffic dictates quantities, sizing, amounts etc. while prices stay static. For example, more users at a website or destination will drive the quantity upwards until one user decides to purchase.

In the case of blank CDs, for example, the price may be set to start at $10 for 100 CDs; higher levels of traffic will cause the quantity of CDs to increase until someone decides to purchase (for example, at $10 for 250 CDs).

Another example is where quantity does not change, but quality changes. For example in the case of ticketing; a starting price of $100 may be set for a particular seat or section of a venue, however the quality of seating goes upwards until someone decides to purchase.

Can also work especially well in the case of services as opposed to products; for example where the length of a service (i.e. warranty, personal training session, massage etc.) is dictated by Peeractive Value; e.g. there is a starting offer of $50 per one hour session, but the length of the session continually increases until someone feels there is enough value in the offer (hence the name Added Value).

Also in the case of an internet or phone service provider; a starting price of $50 a month can provide 50 GB of bandwidth or $500 worth of calls, and Peeractive Value increases the value of the offer until someone purchases.

Peeractive Value can also be used to decrease quantities, length of time, sizing, amounts etc. if need be, for example where it is of benefit to have a reduced waiting time.

Peeractive Advertising (Aka "Ad-Hoc")

Where real time number of viewers dictates the advertisement that is to be shown at a particular time. With the advent of IPTV, Peeractive Advertising is a prime candidate for more efficient television advertising. Different advertisers are willing to pay different amounts to get different levels of exposure, and Peeractive Advertising provides an optimal method of maximizing revenue.

For example, Brand A is willing to spend $10,000 to reach 200,000 viewers during a particular TV show. Brand B is willing to pay $6,000 dollars to reach 100,000 viewers during the same TV show. The Peeractive engine will measure real time viewers, consult the database and decide which advertisement is most closely suited to optimize advertising revenues.

Peeractive Advertising also differs from online cost-per-click models in that advertisements are not based on a direct action from a user (i.e. they do not need to 'click') and as such the model is optimized for online branding as opposed to direct response (which is more suited to cost per click).

Peeractive Demand (Aka "Equilibrium")

Where the Peeractive Engine is used to determine a fixed price which stays static for a fixed period of time.

For example, in the case of ticketing, a promoter announces an on sale time for a new tour. Peeractive Demand will measure traffic/users immediately before sale to determine the price of the tickets, which, once on sale, will stay static for a fixed period of time.

This allows vendors to address any concerns they may have with volatility in pricing whilst still allowing them to optimize pricing relative to demand.

Peeractive Gaming

Where the number of users playing or watching directly affects a part of the game's outcome.

For example a racing game where users need to get more people to look at their link in order to accelerate and in turn win the race. Additionally the winner could receive a prize subsidized by the advertising revenue gained from getting so much traffic to the site.

Peeractive Gambling

Where the number of users looking at a particular link directly affect odds or prizes.

For example an online lottery type system where more/less users looking at the site increases/decreases the size of the jackpot (an alternative model for a traditional lottery).

Another example is betting, where odds increase or decrease based on the number of people looking at a particular bet at a given time.

Peeractive Fundraising

Where charity activities and donations are directly related to user traffic.

Example is a fundraiser, where a person promises to do a task if a certain level of traffic is reached i.e. a celebrity promises to shave their head to raise money for cancer research if x level of users are watching (donations can subsidized by advertising revenue from increasing traffic)

The present disclosure includes any and all embodiments of the following claims.

The invention claimed is:
1. A system comprising:
 (a) a computer store containing data for a first web presentation, the data defining visually perceptible elements corresponding to the first web presentation;
  (i) wherein the first web presentation relates to a web presentation owner; and
  (ii) wherein the first web presentation displays at least one user selectable interface element associated with a commerce object associated with a buying opportunity of a selected merchant;
 (b) a computer server communicatively coupled to the computer store and programmed to:
  (i) receive from the web browser running on a computer of a computer user a signal indicating selection of one of the interface elements;
  (ii) automatically identify as the source presentation the first web presentation on which the selection has been made
  (iii) in response to identification of the source presentation, automatically retrieve the stored data corresponding to the source presentation; and
  (iv) using the data retrieved, automatically generate and transmit to the web browser a second web presentation that displays: (A) information associated with the commerce object associated with the user selection, and (B) the visually perceptible elements visually corresponding to the source presentation, (c) the computer server being communicatively coupled to:
   i. a first database of products offered by the web presentation owner;
   ii. a second database relating and associating price indicia with each of the products;
   iii. a component for receiving a product indicia associated with each of the products;
   iv. a component for initially pricing each of the products with initial indicia;
   v. an indicia adjuster to receive indications of the initial indicia with each of the products and to receive indications of accessing or viewing of selected products in the first database;
   vi. the indicia adjuster adjusting the initial indicia responsive to the accessing or viewing of selected products or perceived demand for the selected products and for forming adjusted indicia associated with each of the selected products, the adjusted indicia comprising a price update; and
   vii. a computer user interface accessible on a website accessed by the computer of the computer user whereby access is through the internet to the website, wherein the user's computer accesses the internet and the user interface through a browser, and wherein the user interface displayed by the browser of the computer user is functional separately from updates from the computer server, and wherein the user interface displayed by the browser accessing the website can act to update the displayed prices independently of the computer server sending a price update to the computer user.

2. The system as claimed in claim 1 wherein the browser can act to update the displayed prices independently of the computer sending the price update.

3. The system as claimed in claim 1 wherein a displayed price update rate is signaled as a rate of changes for proceeding price updates.

4. The system as claimed in claim 1 wherein a displayed price update rate is calculated by interpolating from a currently displayed price at said browser, and a future target price.

5. The system as claimed in claim 1 wherein a displayed price update rate is calculated by said browser receiving a peer pressure indicator or raw data indicative of said indicator comprising the number of active peers viewing said products.

6. A system comprising:
(a) a computer store containing data for a first web presentation, said data defining a plurality of visually perceptible elements corresponding to the first web presentation;
   (i) wherein each of the first web presentations relates to a web presentation owner; and
   (ii) wherein the first web presentation displays at least one active link associated with a commerce object associated with a buying opportunity of a selected merchant; and
(b) a computer server communicatively coupled to the computer store and programmed to:
   (i) receive from the web browser running on a computer of a computer user a signal indicating activation of one of the links displayed by one of the first web presentation;
   (ii) automatically identify as the source presentation the first web presentation on which the link has been activated;
   (iii) in response to identification of the source presentation, automatically retrieve the stored data corresponding to the source presentation; and
   (iv) using the data retrieved, automatically generate and transmit to the web browser a second web presentation that displays: (A) information associated with the commerce object associated with the link that has been activated, and (B) the plurality of visually perceptible elements visually corresponding to the source presentation, (c) the computer server being communicatively coupled to:
   ii. a first database of commerce objects being products on the first web presentation;
   iii. a second database relating and associating price indicia with each of the products;
   iv. a component for receiving products and/or services indicia associated with each of the products and/or services files stored at the products and/or services first database;
   v. a component for initially pricing each of the products with initial indicia;
   vi. an indicia adjuster to receive indications of the initial indicia with each of the products and to receive indications of accessing or viewing of the first database for each of the products;
   vii. the indicia adjuster adjusting the initial indicia responsive to the accessing or viewing or perceived demand for each product and for forming adjusted indicia associated with each of the products, the adjusted indicia comprising a price update;
   viii. a computer user interface accessible on a website accessed by the computer of the computer user whereby access is through the internet to the website, wherein the computer user accesses the internet and the user interface through a browser running on the user's computer, and wherein the user interface displayed by the browser of the computer is functional separately from updates from the computer server, and wherein the user interface displayed by the browser can act to update the displayed prices independently of the computer server sending a price update to the computer user, and
   xi. wherein potential demand and pricing for products provided by the website is determined by determining the amount of access being made to the website displaying the products.

7. The system as claimed in claim 6 wherein the browser can act to update the displayed prices independently of the computer sending the price update.

8. The system as claimed in claim 6 wherein a displayed price update rate is signaled as a rate of changes for proceeding price updates.

9. The system as claimed in claim 6 wherein a displayed price update rate is calculated by interpolating from a currently displayed price at said browser, and a future target price.

10. The system as claimed in claim 6 wherein a displayed price update rate is calculated by said browser receiving a peer pressure indicator or raw data indicative of said indicator comprising, the number of active peers viewing said products.

* * * * *